United States Patent
Takahashi et al.

(10) Patent No.: US 11,327,851 B2
(45) Date of Patent: May 10, 2022

(54) INFORMATION PROCESSING SYSTEM, INFORMATION PROCESSING METHOD, AND NON-TRANSITORY COMPUTER-READABLE STORAGE MEDIUM FOR STORING INFORMATION PROCESSING PROGRAM

(71) Applicant: FUJITSU LIMITED, Kawasaki (JP)

(72) Inventors: Eiichi Takahashi, Kawasaki (JP); Akira Shiba, Kawasaki (JP); Miwa Okabayashi, Sagamihara (JP); Naoki Nishiguchi, Kawasaki (JP); Hisatoshi Yamaoka, Kawasaki (JP); Kota Itakura, Kawasaki (JP); Daisuke Kasamatsu, Kawasaki (JP); Takafumi Onishi, Kawasaki (JP); Tatsuro Matsumoto, Yokohama (JP); Kazuki Matsui, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/038,775

(22) Filed: Sep. 30, 2020

(65) Prior Publication Data
US 2021/0103500 A1 Apr. 8, 2021

(30) Foreign Application Priority Data
Oct. 7, 2019 (JP) .............................. JP2019-184256

(51) Int. Cl.
*G06F 12/00* (2006.01)
*G06F 11/14* (2006.01)

(52) U.S. Cl.
CPC ...... *G06F 11/1469* (2013.01); *G06F 11/1448* (2013.01); *G06F 11/1464* (2013.01)

(58) Field of Classification Search
CPC ............. G06F 11/1469; G06F 11/1448; G06F 11/1464; G06F 11/1458; G06F 11/1446
See application file for complete search history.

(56) References Cited

U.S. PATENT DOCUMENTS

2006/0047925 A1  3/2006 Perry
2007/0014243 A1  1/2007 Meyer et al.
(Continued)

FOREIGN PATENT DOCUMENTS

JP  H08-125690 A  5/1996
JP  H11-177616 A  7/1999
(Continued)

*Primary Examiner* — Shawn X Gu
(74) *Attorney, Agent, or Firm* — Fujitsu Patent Center

(57) ABSTRACT

An information processing system includes: a first storage device configured to store state data corresponding to processing executed on input data that is stored in a buffer; and a processing device configured to: calculate a first time point when the buffer overflows from an input rate of the input data to the buffer, and determine a second time point by using the input rate, an update amount of the state data per unit time, a first throughput of the backup processing on the state data from the first storage device to the second storage device, a second throughput of restoration processing on the state data from the second storage device to the first storage device, and a third throughput of the processing, the second time being a time point that is before the first time point and when backup processing on the state data is to be started.

8 Claims, 19 Drawing Sheets

(56) References Cited

U.S. PATENT DOCUMENTS

| | | |
|---|---|---|
| 2008/0005322 A1 | 1/2008 | Hatakeyama |
| 2008/0282048 A1* | 11/2008 | Miura ................. G06F 11/1464 |
| | | 711/162 |
| 2011/0167429 A1 | 7/2011 | Tomita |
| 2016/0004720 A1 | 1/2016 | Tabaaloute et al. |
| 2019/0243740 A1* | 8/2019 | Kambe ................. G06F 9/4887 |

FOREIGN PATENT DOCUMENTS

| | | |
|---|---|---|
| JP | 2000-307602 A | 11/2000 |
| JP | 2004-229115 A | 8/2004 |
| JP | 2007-323345 A | 12/2007 |
| JP | 2008-511082 A | 4/2008 |
| JP | 2008-258847 A | 10/2008 |
| JP | 2009-501499 A | 1/2009 |
| JP | 2011-141695 A | 7/2011 |
| JP | 2013-232807 A | 11/2013 |
| JP | 2016-512633 A | 4/2016 |

\* cited by examiner

FIG. 1
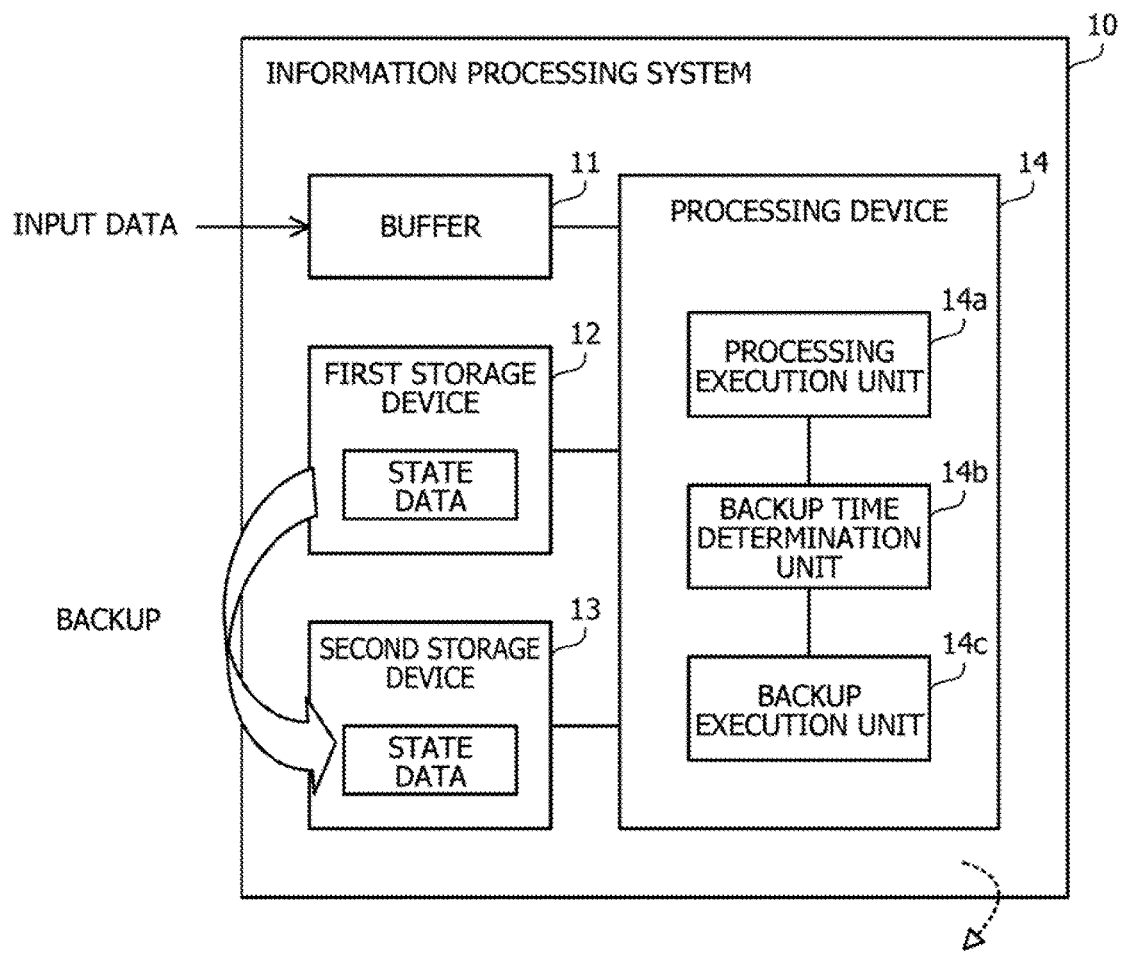
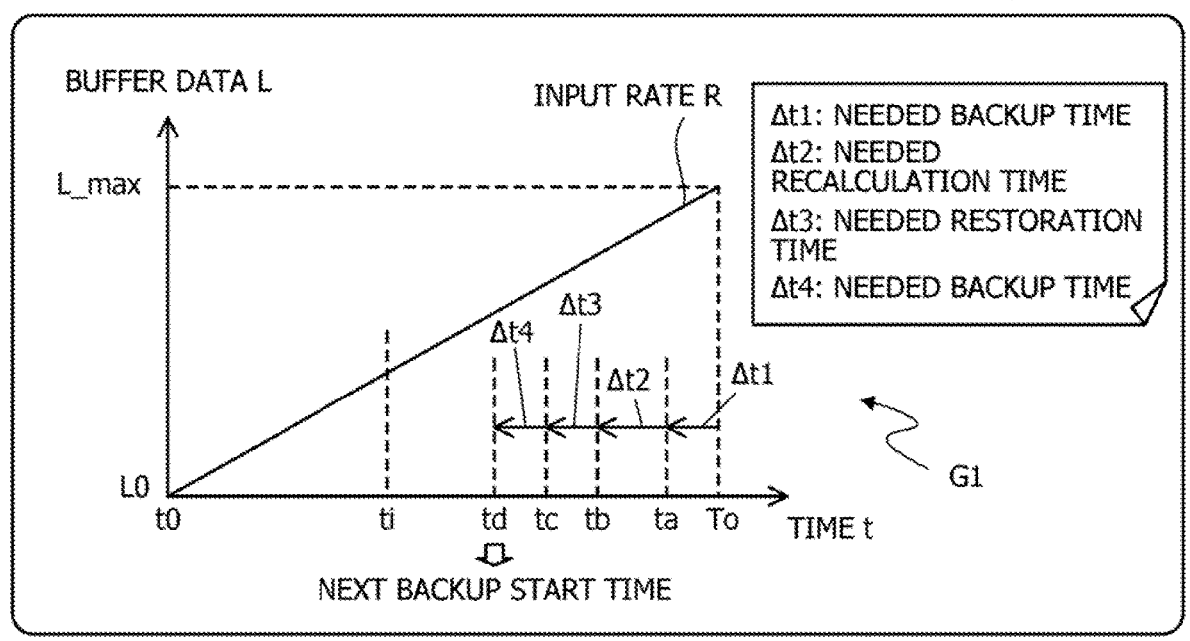

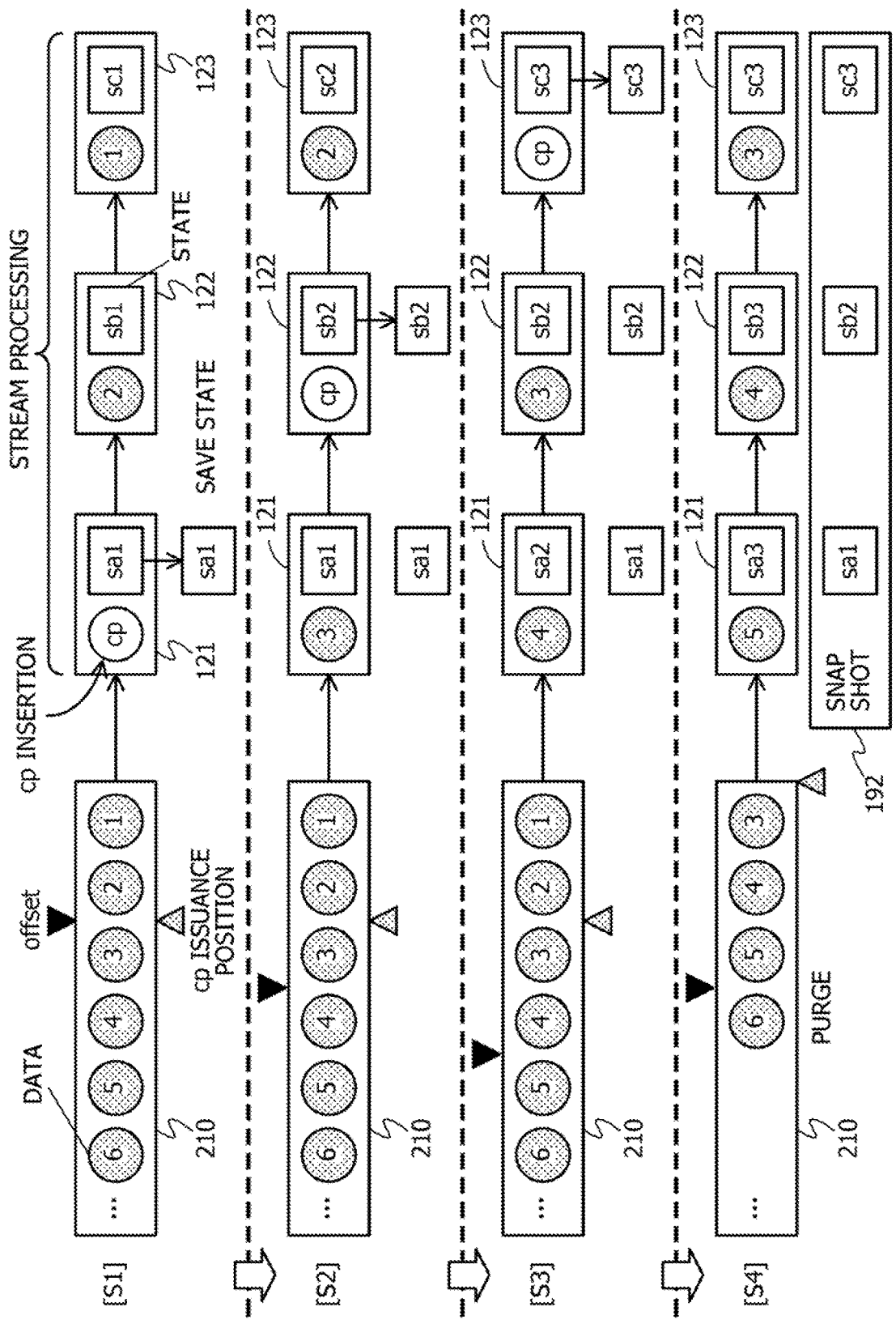

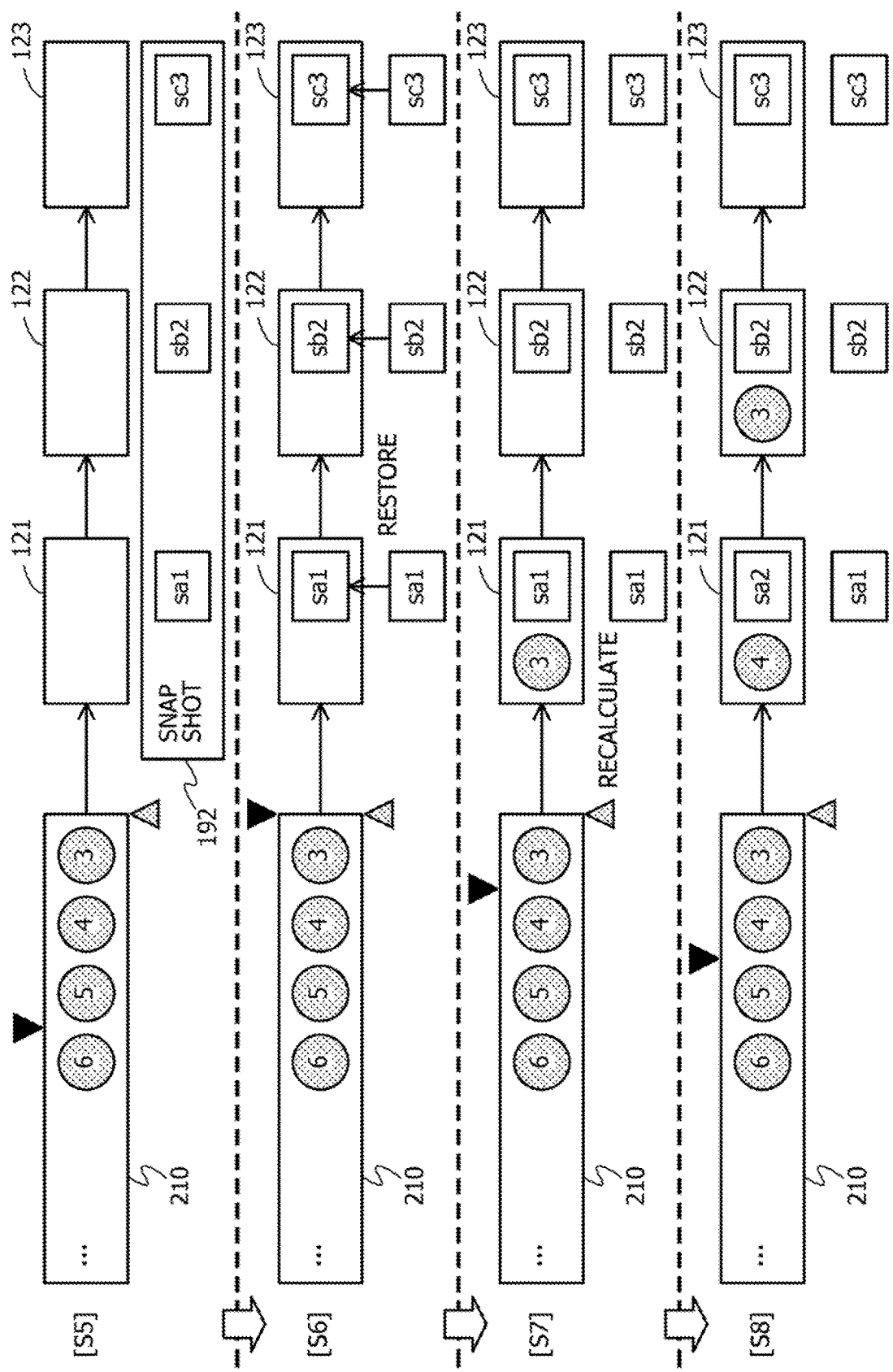

FIG. 11

| BUFFER DATA AMOUNT MEASUREMENT TABLE | | 221 |
|---|---|---|
| ELAPSED TIME FROM PREVIOUS CHECKPOINT | DATA AMOUNT OF INPUT BUFFER UNIT | |
| t0 | I0 | |
| t1 | I1 | |
| t2 | I2 | |
| ... | ... | |

FIG. 12

| THROUGHPUT MEASUREMENT TABLE | | | |
|---|---|---|---|
| DATA PROCESSING START TIME | DATA PROCESSING END TIME | DATA PROCESSING TIME | TOTAL DATA AMOUNT |
| ts1 | te1 | pt1 | pv1 |
| ts2 | te2 | pt2 | pv2 |
| ... | ... | ... | ... |

FIG. 13

| STATE UPDATE SIZE MEASUREMENT TABLE | 151 |
|---|---|
| ELAPSED TIME FROM PREVIOUS CHECKPOINT | STATE UPDATE SIZE |
| t0 | uv0 |
| t1 | uv1 |
| t2 | uv2 |
| ... | ... |

FIG. 14

| RESTORATION THROUGHPUT MEASUREMENT TABLE | | 161 |
|---|---|
| BACKUP SIZE | RESTORATION TIME |
| bv0 | rt0 |
| bv1 | rt1 |
| bv2 | rt2 |
| ... | ... |

FIG. 15

| CHECKPOINT THROUGHPUT MEASUREMENT TABLE | | | |
|---|---|---|---|
| CHECKPOINT START TIME | CHECKPOINT END TIME | CHECKPOINT PROCESSING TIME | BACKUP SIZE |
| tcs1 | tce1 | ct1 | cv1 |
| tcs2 | tce2 | ct2 | cv2 |
| ... | ... | ... | ... |

INFORMATION PROCESSING SYSTEM, INFORMATION PROCESSING METHOD, AND NON-TRANSITORY COMPUTER-READABLE STORAGE MEDIUM FOR STORING INFORMATION PROCESSING PROGRAM

CROSS-REFERENCE TO RELATED APPLICATION

This application is based upon and claims the benefit of priority of the prior Japanese Patent Application No. 2019-184256, filed on Oct. 7, 2019, the entire contents of which are incorporated herein by reference.

FIELD

The embodiment discussed herein is related to an information processing system, an information processing method, and a non-transitory computer-readable storage medium storing an information processing program.

BACKGROUND

As an information processing system, there is an event processing system that receives input data indicating an event from various terminal devices, updates data held by an information processing system according to the event, and executes information processing according to the update of the data. For example, the information processing system collects input data including sensor information measured by using a sensor device from the terminal device such as a smartphone or an on-vehicle device and holds state data indicating a state of the terminal device or the like. For example, the information processing system realizes an information service for detecting update of the state data and providing information in accordance with a current state of the terminal device or the like.

Here, there is a case where, in the information processing system, backup of data is performed in order to prepare for data loss at the time when a failure occurs or the like. For example, a system is proposed that generates a backup of a connection data set (e-mail, contacts, or the like) in a server on the basis of a predetermined backup interval.

Furthermore, a data center device is proposed that performs a communication service by using a virtual server associated with a user device when the user device issues a communication service execution request. In a case where it is needed to perform the backup by performing the communication service, the proposed data center device performs backup scheduling corresponding to the virtual server and a backup service by a Central Processing Unit (CPU).

Examples of the related art include Japanese National Publication of International Patent Application No. 2009-501499 and Japanese Laid-open Patent Publication No. 2013-232807.

SUMMARY

According to an aspect of the embodiments, an information processing system includes: a first storage device configured to store state data corresponding to processing executed on input data that is stored in a buffer; and a processing device configured to: calculate a first time point, the first time point being a point of time when the buffer overflows from an input rate of the input data to the buffer; and determine a second time point, by using the input rate, an update amount of the state data per unit time, a first throughput of the backup processing on the state data from the first storage device to the second storage device, a second throughput of restoration processing on the state data from the second storage device to the first storage device, and a third throughput of the processing, the second time point being a point of time that is before the first time and being and when backup processing on the state data is to be started.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of an information processing system according to a first embodiment;

FIG. 8 illustrates an example of backup;

FIG. 9 illustrates an example of recovery;

FIG. 11 illustrates an example of a buffer data amount measurement table;

FIG. 12 illustrates an example of a throughput measurement table;

FIG. 13 illustrates an example of a state update size measurement table;

FIG. 14 illustrates an example of a restoration throughput measurement table;

FIG. 15 illustrates an example of a checkpoint throughput measurement table;

DESCRIPTION OF EMBODIMENT(S)

Figure 2:
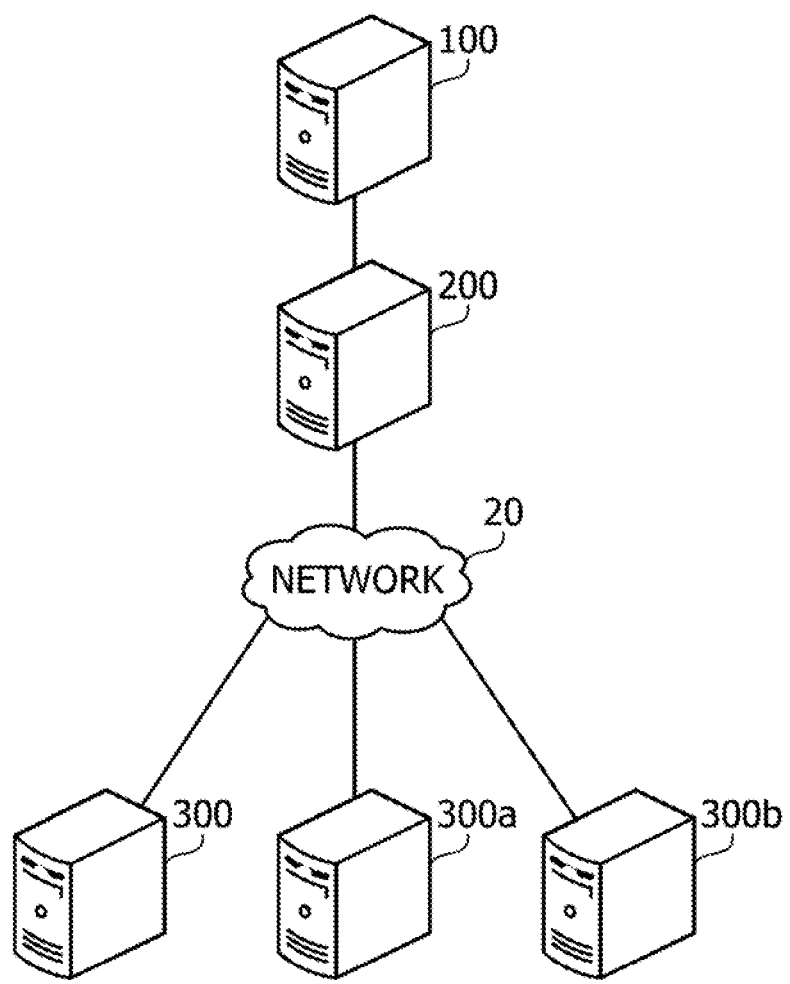
FIG. 2 illustrates an example of an information processing system according to a second embodiment.

There is a case where backup of state data held by an information processing system is acquired. Here, input data received by the information processing system is held by a buffer. When backup of state data at a certain time is acquired, input data before that time is unnecessary for restoration of the state data. Therefore, the input data can be deleted from the buffer.

A capacity of the buffer is limited. Therefore, it is considered to suppress occurrence of a buffer overflow by executing backup processing of the state data at relatively short time intervals. However, as a frequency of the backup processing of the state data is Increased, a load caused by the backup processing is increased, and processing performance of the information processing system is lowered.

On the other hand, as the time intervals of the backup processing get longer, an amount of data held by the buffer increases. Therefore, a possibility increases that a buffer overflow occurs at the time of recovery of the state data due to input data input during recovery processing.

According to one aspect, provided is a solution to appropriately determine a timing for executing backup processing.

Hereinafter, the present embodiment will be described with reference to the drawings.

First Embodiment

A first embodiment will be described.

FIG. 1 is a diagram illustrating an example of an information processing system according to the first embodiment.

An information processing system 10 includes a buffer 11, a first storage device 12, a second storage device 13, and a processing device 14.

The buffer 11 stores input data. The input data received by the information processing system 10 from another device (not illustrated) is stored in the buffer 11. For example, a First-In/First-Out (FIFO) is used for a procedure for writing and reading the input data to and from the buffer 11. The first storage device 12 is a volatile storage device such as a Random Access Memory (RAM). The first storage device 12 stores state data corresponding to processing executed by the processing device 14. The second storage device 13 is a nonvolatile storage device such as a Hard Disk Drive (HDD) or a Solid State Drive (SSD). The second storage device 13 stores backup of the state data stored in the first storage device 12.

Here, power is supplied to the buffer 11 separately from the first storage device 12 and the processing device 14. For example, the buffer 11 may be mounted on a first information processing device (not illustrated), and the first storage device 12 and the processing device 14 may be mounted on a second information processing device (not illustrated). Note that the second storage device 13 may be an external storage of the second information processing device and may be mounted in the second information processing device. Since the power is supplied to the buffer 11 separately from the first storage device 12, even if the first storage device 12 and the processing device 14 go down, input data that is newly received is continuously stored.

The processing device 14 includes a processor, for example, a CPU, a Graphics Processing Unit (GPU), a Digital Signal Processor (DSP), or the like. However, the processing device 14 may include an electronic circuit for a specific application such as an Application Specific Integrated Circuit (ASIC), and a Field Programmable Gate Array (FPGA). The processor executes a program stored in a memory (may be first storage device 12). There is a case where set of a plurality of processors is referred to as a "multiprocessor" or simply referred to as a "processor".

The processing device 14 executes processing based on the input data stored in the buffer 11 and updates the state data stored in the first storage device 12. A unit of the processing executed on the input data by the processing device 14 is referred to as a task. For example, the processing device 14 executes stream processing for sequentially performing a plurality of tasks on the input data. The stream processing may be realized by a pipeline including the plurality of tasks. In this case, the single task corresponds to a single stage of the pipeline. The state data may be information indicating states of the plurality of tasks.

The processing device 14 includes a processing execution unit 14a, a backup time determination unit 14b, and a backup execution unit 14c.

The processing execution unit 14a performs the task on the input data. In a case of executing the stream processing, there is a case where the processing execution unit 14a performs the plurality of tasks on the input data in order. There is a case where the processing execution unit 14a updates the state data stored in the first storage device 12 in response to the execution of the task.

The backup time determination unit 14b determines a time to start backup processing of the state data stored in the first storage device 12.

First, the backup time determination unit 14b calculates a first time To when the buffer 11 overflows from an input rate R of the input data to the buffer 11. The input rate R indicates a data amount of input data stored in the buffer 11 per unit time. Furthermore, the backup time determination unit 14b acquires throughputs of following three types of processing. The throughput indicates a data amount that can be processed per unit time.

A first throughput is a throughput of the backup processing of the state data from the first storage device 12 to the second storage device 13. The first throughput is used as a parameter related to a time needed for the backup processing. For example, the backup time determination unit 14b can acquire the time needed for the backup processing on the basis of the first throughput and a size of data that is a backup target at the corresponding time.

A second throughput is a throughput of the restoration processing of the state data from the second storage device 13 to the first storage device 12. The second throughput is used as a parameter related to a time needed for the restoration processing. For example, the backup time determination unit 14b can acquire the time needed for the restoration processing on the basis of the second throughput and a size of data to be restored.

A third throughput is a throughput of processing executed by the processing execution unit 14a on the input data. The third throughput is used as a parameter related to a time needed for recalculation processing. The recalculation processing is processing for recalculating state data immediately before occurrence of a failure from the restored state data by performing the task by using the input data held in the buffer 11. For example, the backup time determination unit 14b can acquire the time needed for the recalculation processing on the basis of the third throughput and a size of the input data held in the buffer 11.

Then, the backup time determination unit 14b determines a second time td when the backup processing of the state data is started on the basis of the input rate R, the update amount of the state data per unit time, the first throughput, the second throughput, and the third throughput. The second time td is a time before the first time To.

Here, a graph G1 is illustrated in FIG. 1. The graph G1 illustrates an example of a relationship between a time t and a buffer data amount L in the buffer 11. The horizontal axis of the graph G1 indicates the time t, and the vertical axis indicates the buffer data amount L. A previous backup end time t0 is set to an origin of the time t, and the time t indicates an elapsed time from the time t0. Each time is expressed by the elapsed time from the time t0. For example, a time To Indicates a time at which the elapsed time from the time t0 is To. The buffer data amount L at each time can be obtained from a buffer data amount L0 and the input rate R at the time t0 and the elapsed time from the time t0. The upper limit of the buffer data amount L is L_max. When the buffer data amount L exceeds the upper limit L_max, a buffer overflow occurs. To=(L_max−L0)/R For example, the backup time determination unit 14b acquires the input rate R, the time To, and the above first, the above second, and the above third throughputs at a time ti.

Then, first, the backup time determination unit 14b obtains a time ta before the time To by a time period Δt1 on the basis of an update amount (assumed to be u) of the state data per unit time and the first throughput (assumed to be TH_1). The time period Δt1 is a predicted time period needed for the backup processing of the state data at the time ta. The time ta is a time to start the backup processing in a case where the backup processing is completed at the time To. For example, Δt1=u×ta/TH_1 is satisfied. By solving To−Δt1=ta for ta, the time ta is obtained.

Next, the backup time determination unit 14b obtains a time tb before the time ta by a time period Δt2 on the basis of the input rate R and the third throughput (assumed to be TH_3). Furthermore, the backup time determination unit 14b obtains a time tc before the time tb by a time period Δt3 on the basis of a size (assumed to be U) of the previous backup and the second throughput (assumed to be TH_2). A time period Δt3 is a predicted time period needed for the restoration processing for restoring the state data of the first storage device 12 from the backup that has been acquired at the time t0 in a case where a failure occurs at the time tc and the state data of the first storage device 12 disappears. The time period Δt2 is a predicted time period needed for the recalculation processing for recalculating the state data that has been restored at the time tb to the state at the time tb. The time tc is a time to start the restoration processing in a case where the restoration processing and the recalculation processing of the backup state are completed at the time ta. For example, Δt2=R×tb/TH_3 is satisfied. Δt3=U/TH_2 By solving ta−Δt2=tb for tb, the time tb is obtained. The time tc is obtained by tc=tb−Δt3−α (α is real number equal to or more than zero). As indicated in this formula, the time tc may be a time before tb−Δt3 by the time α. For example, the time α is estimated in advance according to a time from the system stop detection to the recovery start.

Moreover, the backup time determination unit 14b obtains a time td before the time tc by a time period Δt4 on the basis of the update amount of the state data per unit time and the first throughput. The time period Δt4 is a predicted time period needed for the backup processing of the state data at the time td. The time td is a time to start the backup processing in a case where the backup processing is completed at the time tc. For example, Δt4=u×td/TH_1 is satisfied. By solving tc−t4=td for td, the time td is obtained.

Then, the backup time determination unit 14b determines, for example, the time td as a start time of the next backup processing. However, the backup time determination unit 14b may set the start time of the next backup processing as a time before the time td by a predetermined time period.

The backup execution unit 14c starts the backup processing of the state data at the time td determined by the backup time determination unit 14b. In the backup processing, the backup execution unit 14c stores a copy of the state data stored in the first storage device 12 in the second storage device 13. The backup execution unit 14c starts the backup processing of the state data at the time td. When the backup processing ends, the backup execution unit 14c deletes the input data that has been input to the processing execution unit 14a before the time td from the buffer 11. This increases a free space of the buffer 11.

According to the information processing system 10, the first time To when the buffer 11 overflows is calculated from the input rate R of the input data to the buffer 11. The second time when the backup processing is started that is the second time td before the first time To is determined on the basis of the first time To, the first throughput of the backup processing, the second throughput of the restoration processing, and the third throughput of the processing by the task.

With this operation, it is possible to appropriately determine a time for executing the backup processing.

Here, the time To is a predicted time when the data size of the buffer 11 reaches the upper limit size L_max. When the backup processing is completed before the time To, a free space is generated in the buffer 11. Therefore, it is possible to avoid the overflow of the buffer 11. The time ta is a final backup start time with which the backup processing can be completed before the time To.

Furthermore, there is a possibility that the state data of the first storage device 12 disappears due to a failure or the like and the recovery processing of the state data is executed in the information processing system 10. The recovery processing is a set of the restoration processing of the state data from the backup and the recalculation processing by using the restored state data. The time tc is a final restoration start time with which the recovery processing can be completed at the time ta. Therefore, in order to guarantee that the recovery processing is not executed at and after the time tc, it is sufficient that the backup processing be completed before the time tc. The time td is a final backup start time with which the backup processing can be completed before the time tc. Therefore, for example, by starting to execute the next backup processing at the time td, the processing device 14 can avoid the overflow of the buffer 11 even if the recovery processing is executed.

For example, even if data processing cost expressed by the input rate R, the first, the second, and the third throughputs fluctuates, the information processing system 10 can adjust the timing of the backup processing in accordance with the fluctuation. By executing the backup processing by the information processing system 10 at a minimum frequency at which the buffer does not overflow, it is possible to reduce the cost of the backup processing and avoid deterioration in the original task processing performance of the information processing system 10.

Second Embodiment

Next, a second embodiment will be described.

FIG. 2 is a diagram illustrating an example of an information processing system according to the second embodiment.

The information processing system according to the second embodiment is an event processing system that collects event messages from edge devices, processes the event messages in real time, and provides an event-driven service.

The information processing system according to the second embodiment includes a node 100, a message server 200, and edge devices 300, 300a, and 300b. The message server 200 and the edge devices 300, 300a, and 300b are connected to a network 20. The network 20 is, for example, a wide area communication network such as the Internet. The node 100 and the message server 200 are provided in a data center, for example. The node 100 and the message server 200 may be connected to a Local Area Network (LAN) in the data center.

The node 100 is a server computer that executes stream processing on the event message. The node 100 processes the event messages in sequence input from the message server 200 in sequence. The stream processing is realized by a pipeline including a plurality of processing elements.

Sub-processing corresponding to one stage of the pipeline in the stream processing is referred to as a task.

In the stream processing, there is a case where a data processing result is held in task unit as a state (condition) for each task and the state is used in the subsequent data processing. Such stream processing is referred to as stateful stream processing. The node 100 executes the stateful stream processing. The information processing system according to the second embodiment may include the plurality of nodes 100. The state corresponds to the state data in the first embodiment.

The message server 200 is a server computer that receives the event messages from the edge devices 300, 300a, and 300b and holds the event messages. The message server 200 functions as a buffer of the event message and transmits the event message to the node 100. There is a case where the event messages input to the message server 200 in sequence are referred to as data streams.

The edge devices 300, 300a, and 300b are edge computers that transmit the event messages to the message server 200. Each of the edge devices 300, 300a, and 300b may be a sensor device or an edge-side server computer that aggregates the event messages from end sensor devices and transmits the event messages to the message server 200. For example, each of the edge devices 300, 300a, and 300b may be an on-vehicle device that transmits an event message indicating a speed of an automobile to the message server 200.

Figure 3:
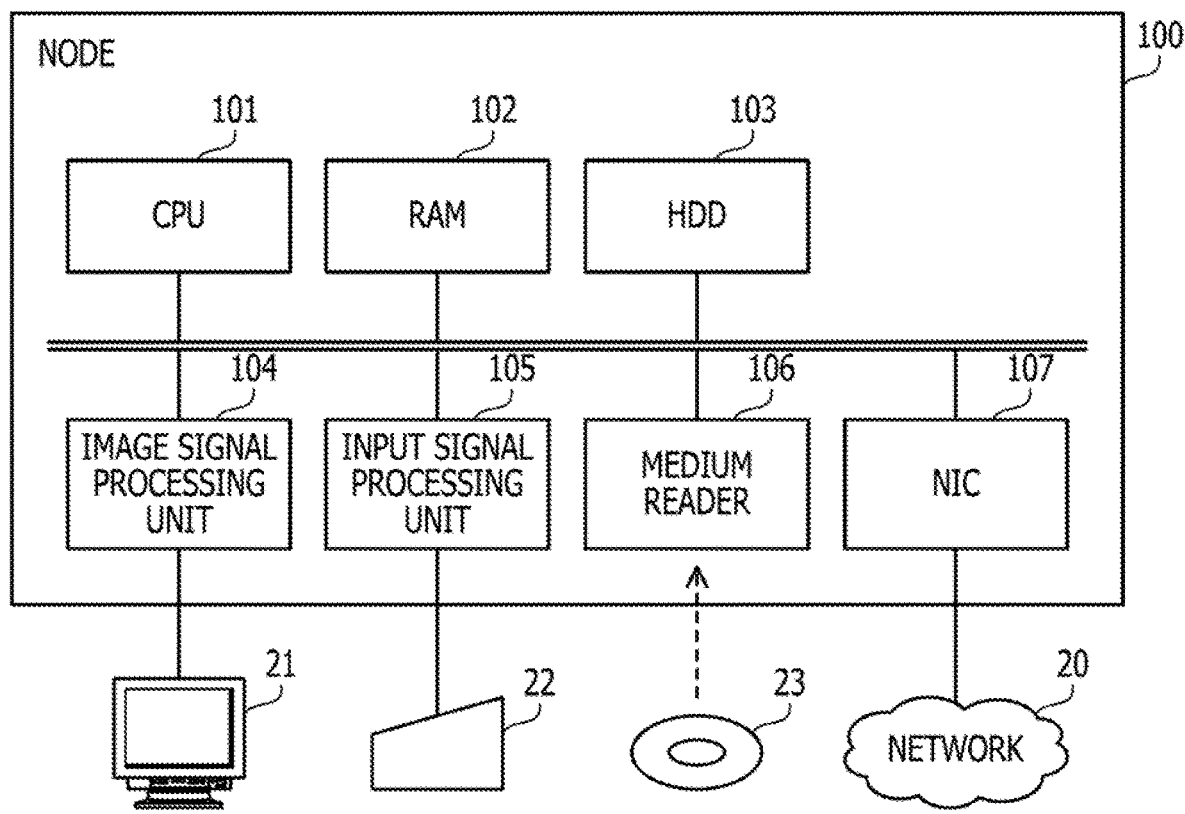
FIG. 3 is a block diagram illustrating exemplary hardware of a node.

FIG. 3 is a block diagram illustrating exemplary hardware of a node.

The node 100 includes a CPU 101, a RAM 102, an HDD 103, an image signal processing unit 104, an input signal processing unit 105, a medium reader 106, and a Network Interface Card (NIC) 107. The above unit of the node 100 is connected to a bus of the node 100. Note that the CPU 101 corresponds to the processing device 14 according to the first embodiment. The RAM 102 corresponds to the first storage device 12 according to the first embodiment. The HDD 103 corresponds to the second storage device 13 according to the first embodiment.

The CPU 101 is a processor that executes program instructions. The CPU 101 loads at least a part of programs and data stored in the HDD 103 into the RAM 102 to execute the programs. Note that the CPU 101 may include a plurality of processor cores. Furthermore, the node 100 may include a plurality of processors. The processing to be described below may be executed in parallel by using the plurality of processors or processor cores. Furthermore, there is a case where a set of a plurality of processors is referred to as a "multiprocessor" or simply referred to as a "processor".

The RAM 102 is a volatile semiconductor memory that temporarily stores programs executed by the CPU 101 and data used by the CPU 101 for operations. Note that the node 100 may include any type of memory other than the RAM, or may include a plurality of memories.

The HDD 103 is a non-volatile storage device that stores programs of software such as an operating system (OS), middleware, and application software, and data. Note that the node 100 may include another type of storage device such as a flash memory or a Solid State Drive (SSD), and may include a plurality of non-volatile storage devices.

The image signal processing unit 104 outputs an image on a display 21 connected to the node 100 in response to an instruction from the CPU 101. As the display 21, any type of display such as a Cathode Ray Tube (CRT) display, a Liquid Crystal Display (LCD), a plasma display, or an Organic Electro-Luminescence (OEL) display may be used.

The input signal processing unit 105 acquires an input signal from an input device 22 connected to the node 100 and outputs the signal to the CPU 101. As the input device 22, a pointing device such as a mouse, a touch panel, a touch pad, and a trackball, a keyboard, a remote controller, a button switch, and the like may be used. Furthermore, a plurality of types of input devices may be connected to the node 100.

The medium reader 106 is a reading device that reads a program or data recorded in a recording medium 23. As the recording medium 23, for example, a magnetic disk, an optical disk, a Magneto-Optical (MO) disk, a semiconductor memory, or the like may be used. Examples of the magnetic disk include a Flexible Disk (FD) and an HDD. Examples of the optical disk include a Compact Disc (CD) and a Digital Versatile Disc (DVD).

The medium reader 106 copies, for example, the program or the data read from the recording medium 23 to another recording medium such as the RAM 102 or the HDD 103. The read program is executed by the CPU 101, for example. Note that the recording medium 23 may be a portable recording medium, and may be used for distribution of a program or data. Furthermore, the recording medium 23 and the HDD 103 may be sometimes referred to as computer-readable recording media.

The NIC 107 is an interface that is connected to the network 20 and communicates with other computers via the network 20. The NIC 107 is connected to a communication device such as a switch or a router by a cable, for example.

Figure 4:
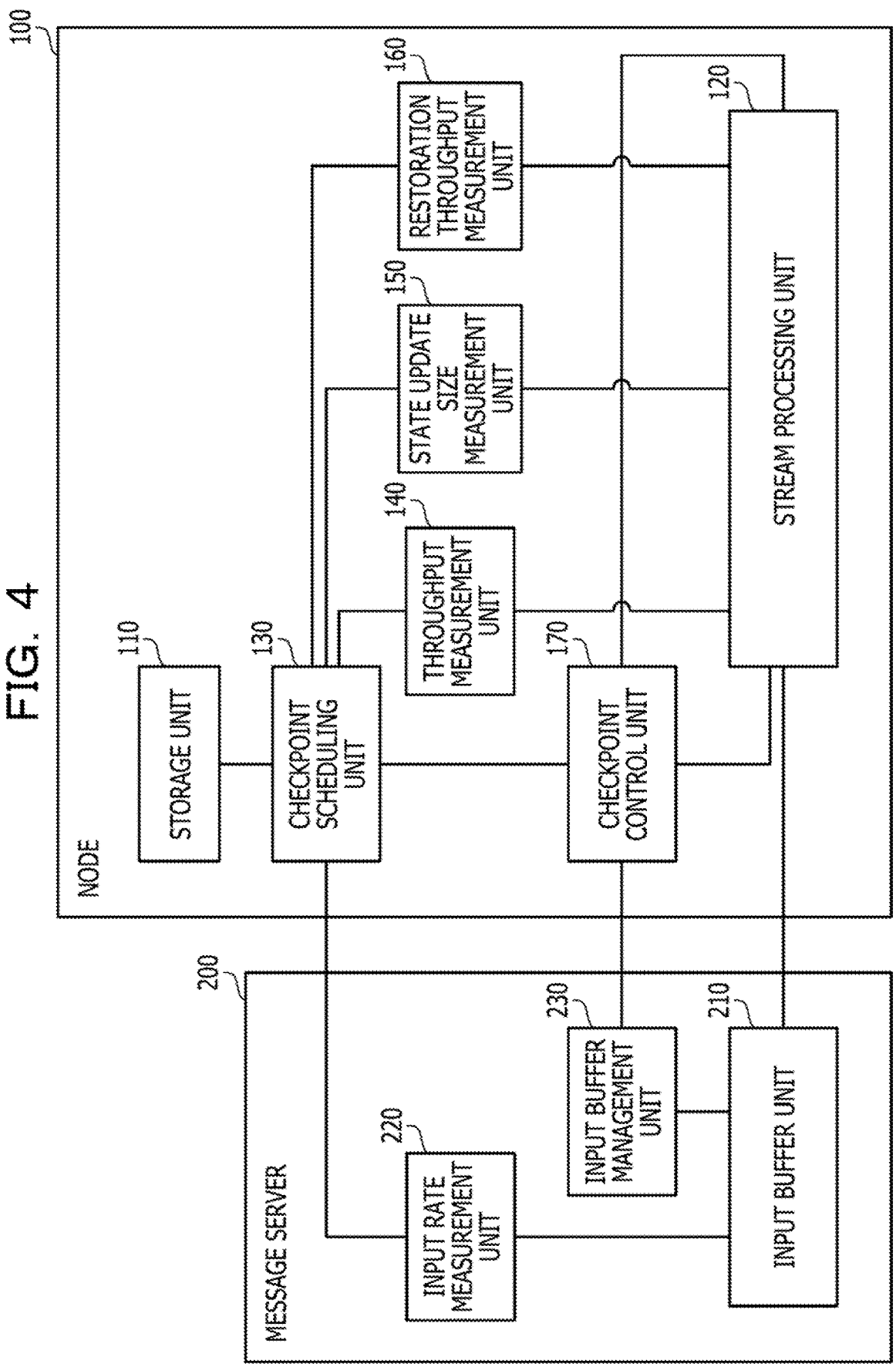
FIG. 4 is a block diagram illustrating a functional example of the information processing system.

FIG. 4 is a block diagram illustrating a functional example of the information processing system.

The node 100 includes a storage unit 110, a stream processing unit 120, a checkpoint scheduling unit 130, a throughput measurement unit 140, a state update size measurement unit 150, a restoration throughput measurement unit 160, and a checkpoint control unit 170. The storage unit 110 uses, for example, a storage region of the RAM 102. The stream processing unit 120, the checkpoint scheduling unit 130, the throughput measurement unit 140, the state update size measurement unit 150, the restoration throughput measurement unit 160, and the checkpoint control unit 170 are implemented, for example, by using a program.

The storage unit 110 stores various measurement data. The measurement data includes the following information. First information is an input rate of the event message to the message server 200. Second information is a throughput of the stream processing by the stream processing unit 120. Third information is a state update size increase rate by each task of the stream processing unit 120. Fourth information is a throughput of the restoration processing of the state of each task. Fifth information is a throughput of the backup processing of the state by each task.

The stream processing unit 120 executes the stream processing on the event message input from the message server 200. Hereinafter, the event message is simply referred to as "data". The stream processing is realized by the pipeline Including the plurality of tasks. Each of the plurality of tasks holds the state. The state is stored in the RAM 102 of the node 100.

The checkpoint scheduling unit 130 determines a timing for acquiring the backup of the state of each task. Here, as a state backup method, there is a method using a checkpoint. In this method, special data called a checkpoint is sent to the stream processing unit 120 similarly to other data. When receiving the checkpoint, each task of the stream processing unit 120 saves a copy of the state at that time in a DataBase (DB) of the HDD 103 or the like as a backup. When the backup of the state is completed, the task sends the checkpoint to the subsequent task. Backup of the entire pipeline is completed at the time when the checkpoint is sent to the final task. Because it is not needed to hold the data before the checkpoint, the data can be discarded from a buffer that holds the data.

When recovery is performed after the node 100 has stopped due to a failure or the like, first, the state of each task is restored at the time of checkpoint by using the previous backup that has been saved. After the restoration, the data is sent from a head of an input buffer unit 210 to the stream processing unit 120. The head data of the input buffer unit 210 at this time is data immediately after the checkpoint. In this way, the node 100 guarantees that the recovered state becomes the same as a state in a case where the node 100 is not stopped.

The checkpoint scheduling unit 130 determines a checkpoint start time on the basis of the throughput of the stream processing to be described later, the state update size increase rate, the throughput of the restoration processing, and the throughput of the backup processing. The checkpoint scheduling unit 130 sets a next checkpoint start time to the checkpoint control unit 170.

The throughput measurement unit 140 measures the throughput of the stream processing. The throughput of the stream processing is a size of data that passed through the pipeline processing by the stream processing unit 120 per unit time. The throughput measurement unit 140 notifies the checkpoint scheduling unit 130 of the measured throughput.

The state update size measurement unit 150 measures a state update size. The state update size is a sum of the data size of the state updated by each task included in the stream processing unit 120. The data size of the state updated by each task is a data size of a difference between the state before being updated and the state after being updated by each task. The state update size measurement unit 150 obtains the state update size increase rate. The state update size increase rate is a size of an updated part of the state per unit time. The size of the updated part of the state corresponds to the update amount of the state. The state update size measurement unit 150 notifies the checkpoint scheduling unit 130 of the state update size increase rate.

The restoration throughput measurement unit 160 measures the throughput of the restoration processing from the backup size of the state and a time needed for the restoration of the state at the time of the recovery processing of the stream processing unit 120. The throughput of the restoration processing is referred to as a "restoration throughput". The restoration throughput measurement unit 160 notifies the checkpoint scheduling unit 130 of the restoration throughput.

The checkpoint control unit 170 issues a checkpoint to the stream processing unit 120 at the checkpoint start time acquired from the checkpoint scheduling unit 130. The checkpoint control unit 170 notifies the message server 200 of the issuance of the checkpoint. When detecting that the checkpoint has passed through the stream processing unit 120, the checkpoint control unit 170 notifies the message server 200 of that the checkpoint ends. Furthermore, the checkpoint control unit 170 acquires a backup size at this checkpoint from the stream processing unit 120 and obtains the throughput of the backup processing from a time needed for passing of the checkpoint. Here, the throughput of the backup processing is referred to as a "checkpoint throughput". The checkpoint control unit 170 notifies the checkpoint scheduling unit 130 of the checkpoint throughput and the backup size.

The message server 200 includes the input buffer unit 210, an input rate measurement unit 220, and an input buffer management unit 230. The input buffer unit 210 uses, for example, a storage region of the RAM. The input rate measurement unit 220 and the input buffer management unit 230 are implemented, for example, by using programs.

The input buffer unit 210 is a FIFO queue that holds the data received from the edge devices 300, 300a, and 300b in a received order. The data stored in the input buffer unit 210 is Input to the stream processing unit 120 from the head of the input buffer unit 210 in order. The input buffer unit 210 corresponds to the buffer 11 according to the first embodiment.

The input rate measurement unit 220 measures an input rate of the input buffer unit 210. The input rate is a data amount stored in the input buffer unit 210 in unit time. The input rate measurement unit 220 transmits the input rate to the checkpoint scheduling unit 130.

The input buffer management unit 230 holds and updates a data position cp immediately after the issuance of the checkpoint in the input buffer unit 210, a data position offset of data to be processed by the stream processing unit 120 next, a final data position last stored in the input buffer unit 210. For example, each of the data positions cp, offset, and last is represented by an address using the head of the input buffer unit 210 as a reference.

The input buffer management unit 230 receives a notification indicating the end of the checkpoint from the checkpoint control unit 170. Then, the input buffer management unit 230 discards data from the head of the input buffer unit 210 to the data immediately before the data immediately after the issuance of the checkpoint. After the data is discarded, the head data of the input buffer unit 210 is data immediately after the issuance of the checkpoint.

In the information processing system according to the second embodiment, even when the node 100 goes down due to a failure, the message server 200 can continue to operate. Therefore, even when the node 100 goes down, the input buffer unit 210 continuously stores the data.

Next, an example of a task configuration of the stream processing unit 120 will be described.

Figure 5:
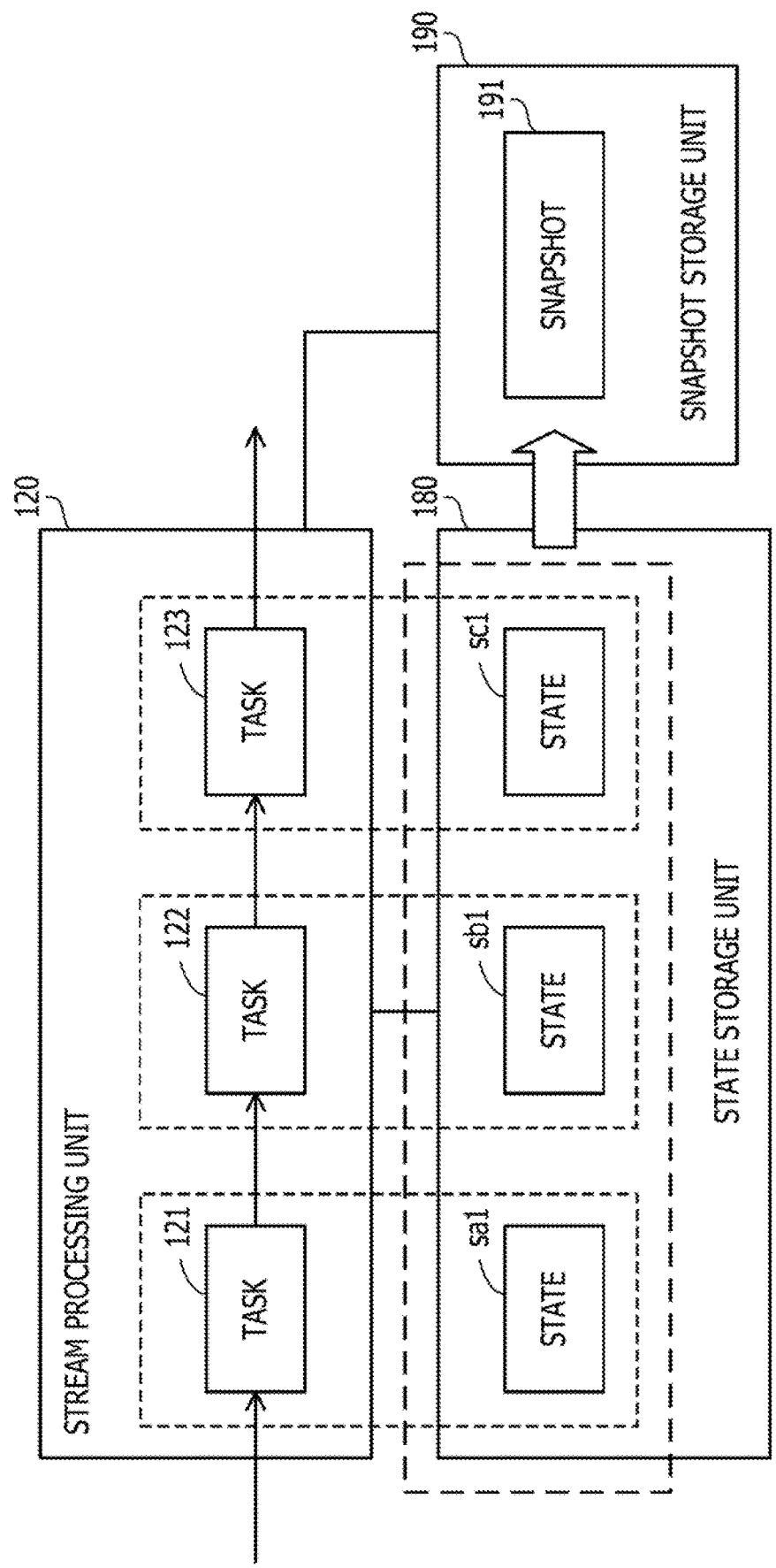
FIG. 5 illustrates an example of a stream processing unit.

FIG. 5 illustrates an example of a stream processing unit.

For example, the stream processing unit 120 includes tasks 121, 122, and 123. The tasks 121, 122, and 123 are performed on the data in this order, and execute the pipeline processing on the data that is input in sequence. The stream processing unit 120 may include a pipeline of two or four or more tasks.

The tasks 121, 122, and 123 respectively hold states sa1, sb1, and sc1. The states sa1, sb1, and sc1 are stored in a state storage unit 180. The state storage unit 180 uses, for example, a storage region of the RAM 102. There is a case where the task 121 updates the state sa1 in response to the processing on the data. Similarly, there is a case where the tasks 122 and 123 respectively update the states sb1 and sc1 in response to the processing on the data.

The states sa1, sb1, and sc1 are respectively backed up by the tasks 121, 122, and 123 in response to the issuance of the checkpoint. A set of the states sa1, sb1, and sc1 that are backed up is referred to as a snapshot 191. The snapshot 191 is stored in a snapshot storage unit 190. The snapshot storage unit 190 uses, for example, a storage region of the HDD 103. The snapshot storage unit 190 may be realized, for example, by an external storage of the node 100.

Next, an exemplary configuration of the input buffer unit 210 will be described.

Figure 6:
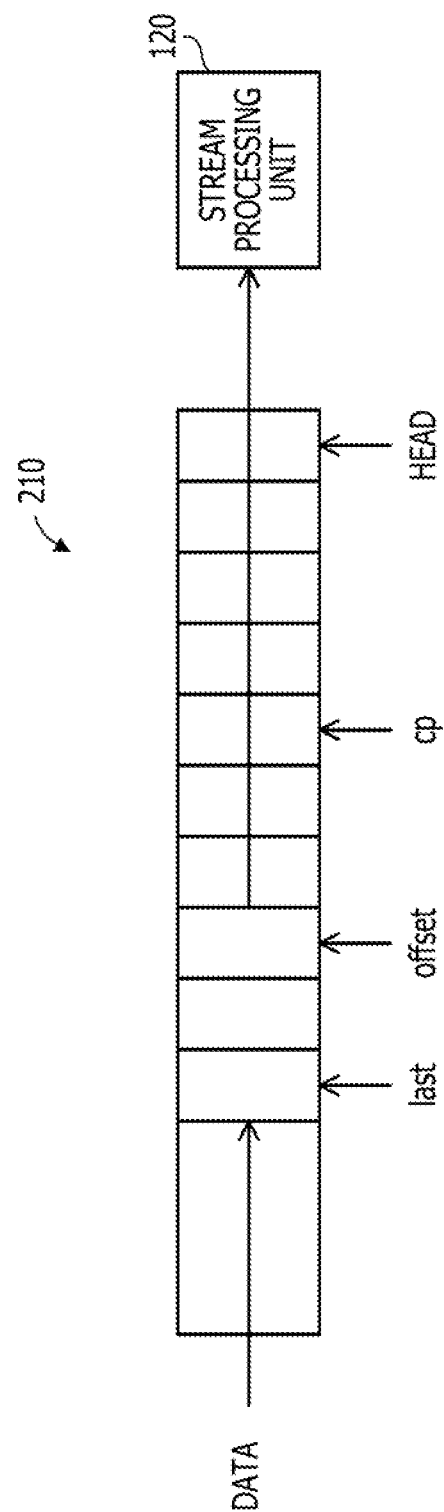
FIG. 6 illustrates an example of an input buffer unit.

FIG. 6 illustrates an example of an input buffer unit.

Data is written in or is read from the input buffer unit 210 according to the procedure of the FIFO as described above. The data is supplied to the stream processing unit 120 from the head data of the input buffer unit 210 in order. The data stored in the stream processing unit 120 remains in the input buffer unit 210 until the data is purged.

FIG. 6 illustrates a state of the input buffer unit 210 before being purged and immediately after the issuance of the checkpoint at a certain time. The data position cp is a position of data immediately after the issuance of the checkpoint. The data position offset is a position of data to be processed next by the stream processing unit 120. The data position last is a position of final data stored in the input buffer unit 210.

Figure 7A:
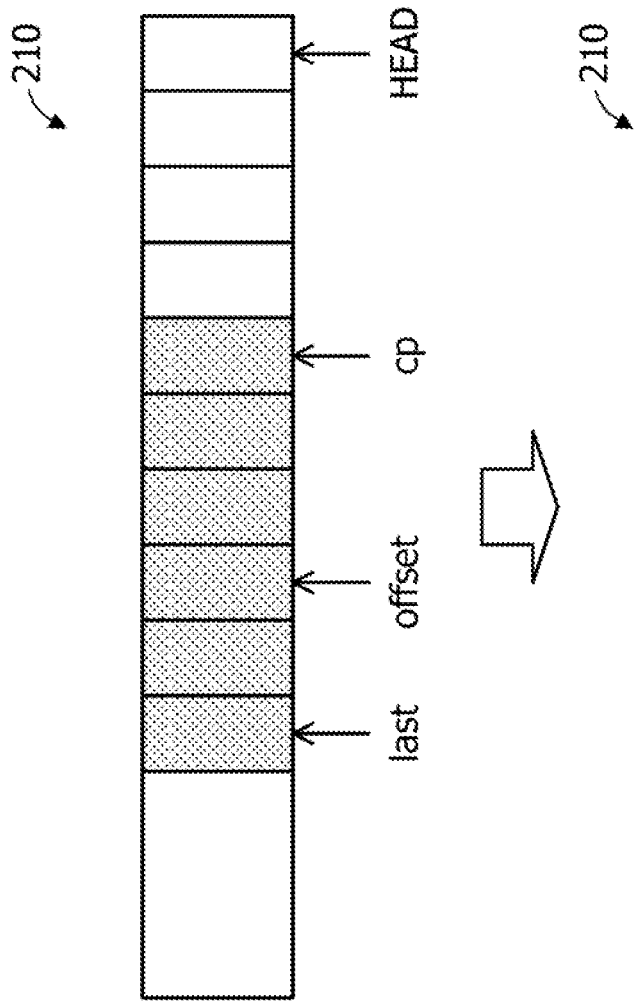
FIGS. 7A and 7B illustrate examples of purge of the input buffer unit.
Figure 7B:
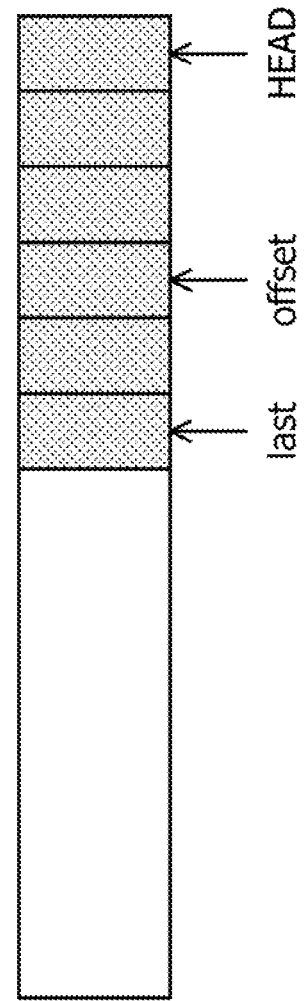

FIGS. 7A and 7B illustrate examples of the purge of the input buffer unit.

FIG. 7A illustrates the state in FIG. 6 that is the state of the input buffer unit 210 immediately before the purge.

FIG. 7B illustrates a state of the input buffer unit 210 after the purge from the state in FIG. 7A. By performing purging, data in the input buffer unit 210 from the head in FIG. 7A to data immediately before the data position cp is discarded. As a result, as Illustrated FIG. 7B, the data at the data position cp in FIG. 7A becomes the head data in the input buffer unit 210.

Next, an example of the backup of the state by using the checkpoint will be described.

FIG. 8 illustrates an example of the backup.

Step S1 is a step at the checkpoint start time. The checkpoint control unit 170 issues a checkpoint to the stream processing unit 120. Here, the data stored in the input buffer unit 210 is denoted with numbers. In FIG. 8, the checkpoint data is represented as cp. At the stage of step S1, the input buffer unit 210 stores data 1 to 6. The checkpoint cp is issued at a position after the data 2. A next data position (offset) in the input buffer unit 210 indicates the position of the data 3. The data position (cp) of the checkpoint in the input buffer unit 210 indicates the position of the data 3.

Since the task 121 receives the checkpoint cp, the state sa1 is saved in the snapshot storage unit 190. Here, there is a case where a state that has been backed up in the past for the task 121 is saved in the snapshot storage unit 190. In this case, it is sufficient that the task 121 back up a difference between the state sa1 and the state that has been backed up in the past (the same applies to backup of state below). The task 122 processes the data 2. The task 122 updates the state sb1 to a state sb2 in response to the processing on the data 2. The task 123 processes the data 1. The task 123 updates the state sc1 to a state sc2 in response to the processing on the data 1.

Step S2 is a step in which the pipeline advances one stage from the step S1. The task 121 transfers the checkpoint cp to the task 122, acquires the next data 3 from the input buffer unit 210, and executes processing using the data 3. The task 121 updates the state sa1 to a state sa2 in response to the processing on the data 3. The next data position (offset) in the input buffer unit 210 indicates a position of the data 4. The task 122 transfers the data 2 to the task 123 and acquires the checkpoint cp from the task 121. Since the task 122 receives the checkpoint cp, the state sb2 is saved in the snapshot storage unit 190. The task 123 outputs the processing result of the data 1, acquires the data 2 from the task 122, and executes processing using the data 2. The task 123 updates the state sc2 to a state sc3 in response to the processing on the data 2.

Step S3 is a step in which the pipeline advances one stage from step S2. The task 121 transfers the data 3 to the task 122, acquires the next data 4 from the input buffer unit 210, and executes processing using the data 4. The task 121 updates the state sa2 to a state sa3 in response to the processing on the data 4. The next data position (offset) in the input buffer unit 210 indicates a position of the data 5. The task 122 transfers the checkpoint cp to the task 123, acquires the data 3 from the task 121, and executes processing using the data 3. The task 122 updates the state sb2 to a state sb3 in response to the processing on the data 3. The task 123 outputs the processing result of the data 2 and acquires the checkpoint cp from the task 122. Since the task 123 receives the checkpoint cp, the state sc3 is saved in the snapshot storage unit 190.

At this timing, with respect to the checkpoint cp, copies of the states sa1, sb2, and sc3 of all the tasks 121, 122, and 123 included in the stream processing for the checkpoint are saved in the snapshot storage unit 190. A snapshot 192 saved in the snapshot storage unit 190 is a set of the copies of the states sa1, sb2, and sc3. Since the snapshot 192 is acquired, data in the input buffer unit 210 before the checkpoint cp is purged. The data before the checkpoint cp is data from the head of the input buffer unit 210 to the data position Immediately before the issuance timing of the checkpoint cp. In a case of the above example, the data before the checkpoint cp indicates the data 1 and 2. Then, the head data of the input buffer unit 210 becomes the data 3.

Step S4 is a step in which the pipeline advances one stage from step S3. The task 121 transfers the data 4 to the task 122, acquires the next data 5 from the input buffer unit 210, and executes processing using the data 5. The next data position (offset) in the input buffer unit 210 indicates a position of the data 6. The task 122 transfers the data 3 to the task 123, acquires the data 4 from the task 121, and executes processing using the data 4. The task 123 outputs the data of the checkpoint cp, acquires the data 3 from the task 122, and executes processing using the data 3.

Next, an example of recovery using the acquired snapshot 192 will be described.

FIG. 9 illustrates an example of the recovery.

A case is considered where a failure occurs after step S4 in FIG. 8 and the states sa3, sb3, and sc3 stored in the state storage unit 180 disappear.

Step S5 indicates a state immediately after the time when the node 100 is restarted because the failure occurs. Although programs of the tasks 121, 122, and 123 are loaded on the RAM 102, the state is lost.

In step S6, the states sa1, sb2, and sc3 of the respective tasks 121, 122, and 123 are restored by the snapshot 192 held in the snapshot storage unit 190. The next data position (offset) in the input buffer unit 210 is updated to Indicate the head of the input buffer unit 210.

In step S7, the task 121 acquires the data 3 from the input buffer unit 210 and executes processing using the data 3. The task 121 updates the state sa1 to the state sa2 in response to the processing on the data 3. The next data position (offset) in the input buffer unit 210 indicates the position of the data 4.

In step S8, the task 121 transfers the data 3 to the task 122, acquires the next data 4 from the input buffer unit 210, and executes processing using the data 4. The task 121 updates the state sa2 to a state sa3 in response to the processing on the data 4. The next data position (offset) in the input buffer unit 210 indicates a position of the data 5. The task 122 acquires the data 3 from the task 121 and executes processing using the data 3. The task 122 updates the state sb2 to the state sb3 in response to the processing on the data 3.

In this way, the states sa1, sb2, and sc3 of the respective tasks 121, 122, and 123 are restored from the snapshot 192. By recalculating the state by using the data stored in the input buffer unit 210, the states sa1, sb2, and sc3 are recovered to the states immediately before the failure.

Next, an example of measurement of an input rate in the input buffer unit 210 will be described.

Figure 10:
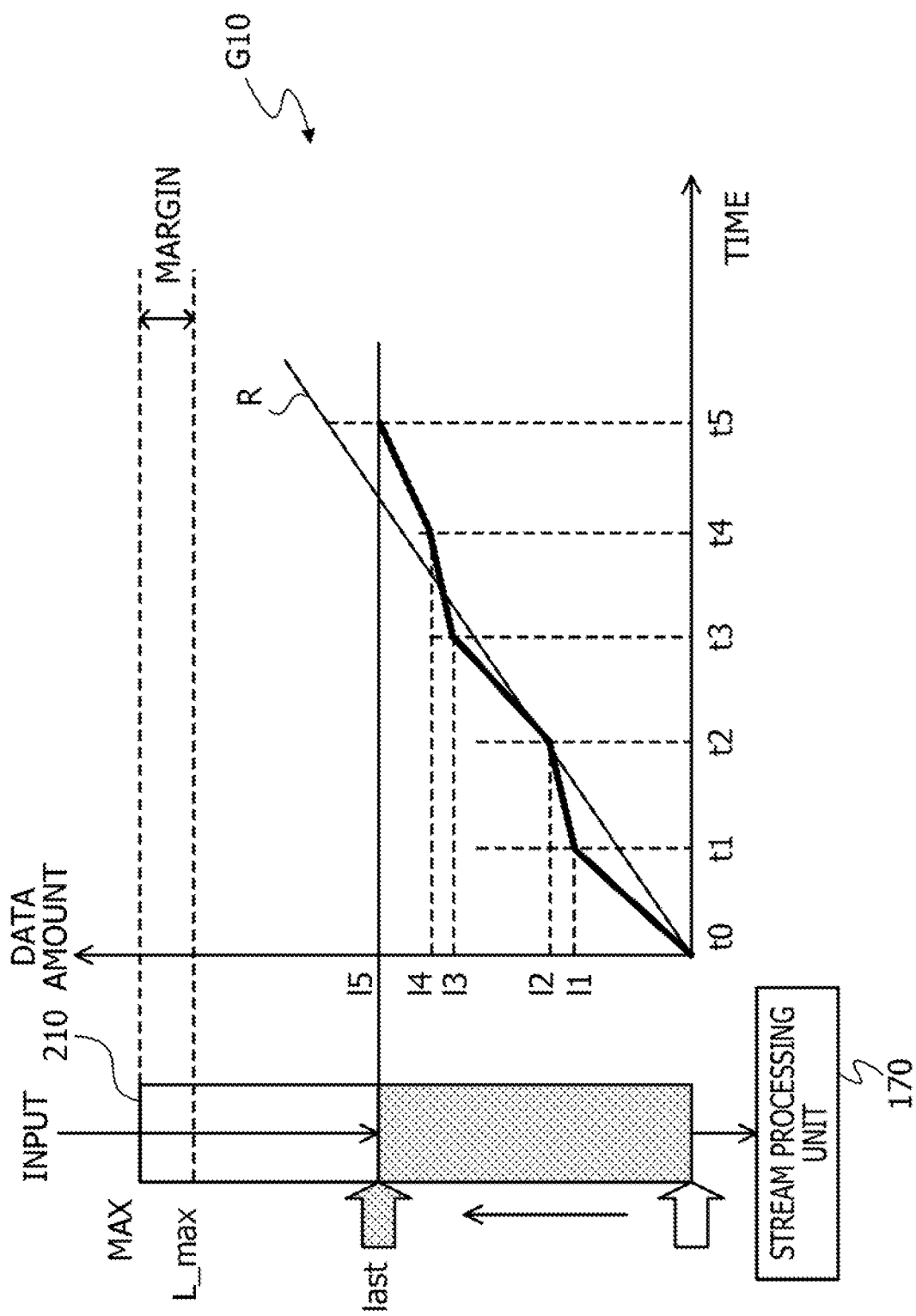
FIG. 10 illustrates an example of an input rate.

FIG. 10 illustrates an example of the input rate.

The graph G10 illustrates an example of a relationship between a time and an amount of data stored in the input buffer unit 210. The horizontal axis of the graph G10 indicates the time, and the vertical axis indicates the amount of the data stored in the input buffer unit 210. On the horizontal axis, a time t0 is set as an origin, and times t1, t2, t3, t4, and t5 are indicated on the basis of an elapsed time from the time t0.

On the left side of the graph G10, the input buffer unit 210 is illustrated. In FIG. 10, the lower end of the input buffer unit 210 indicates the head, and the upper end indicates the tail end. The maximum data amount that can be held by the input buffer unit 210 is assumed as MAX. A position of the tail end where the data is stored from the head of the input buffer unit 210 is last. The upper limit size L_max is an amount of data obtained by subtracting a size of a margin from the maximum data amount MAX that can be held by the input buffer unit 210. When the amount of the data stored in the input buffer unit 210 exceeds the upper limit size L_max, this is regarded as an overflow. The margin that is subtracted from the maximum data amount MAX is a preset value. The margin may be specified by the number of bytes or may be specified by a ratio to the maximum data amount MAX (for example, 5% or the like).

The input rate measurement unit 220 repeatedly measures the amount of the data stored in the input buffer unit 210. The input rate measurement unit 220 acquires a current data amount (last) held by the input buffer unit 210. When a predetermined program that stores the data in the input buffer unit 210 updates the current data amount, the updated current data amount may be notified to the input rate measurement unit 220. FIG. 10 illustrates results of measuring the amount of the data stored in the input buffer unit 210 five times in total including times t1, t2, t3, t4, and t5. A data amount at the time t1 is I1. A data amount at the time t2 is I2. A data amount at the time t3 is I3. A data amount at the time t4 is I4. A data amount at the time t5 is I5.

The input rate measurement unit 220 obtains the input rate R on the basis of the measurement results by linear approximation indicated in the following formula (1). Note that, in the formula, an index of i is a subscript.

$$R = \frac{\sum_i (t_i - t_{ave})(I_i - I_{ave})}{\sum_i (t_i - t_{ave})^2} \quad (1)$$

Here, the number $t_{ave}$ is an average value of $t_i$. The number of $I_{ave}$ is an average value of $I_i$. A straight line in FIG. 10 indicates the input rate R expressed by the formula (1).

The measurement by the input rate measurement unit 220 may be performed at the time when the input buffer unit 210 receives data or may be periodically performed at preset time intervals.

Alternatively, the input rate measurement unit 220 may perform the measurement at the time when an index k[i] expressed by the following formula (2) regarding a data amount $I_i$ of the input buffer unit 210 exceeds an index k[i−1] at the time of previous data amount measurement (at the time of k[i]>k[i−1]).

$$k[i] = \text{floor}\left(I_i \times \frac{dl}{L\_max}\right) \quad (2)$$

Here, the number dl is a preset integer, and is, for example, dl=100. Furthermore, a function floor(x) is a function that returns a maximum integer that does not exceed x. In this way, the checkpoint scheduling unit 130 may acquire the measurement result of the Input rate from the input rate measurement unit 220 each time when the data size of the data stored in the input buffer unit 210 increases by a predetermined rate with respect to the upper limit size of the input buffer unit 210.

Moreover, the input rate measurement unit 220 may perform the measurement at the time when a time La/R[j] has elapsed from the previous data amount measurement. The reference La indicates a preset data size, and is, for example, one % of the upper limit size L_max of the input buffer unit 210. The reference R[j] indicates the input rate that has been measured at the previous time.

The input rate measurement unit 220 may save measurement results in the past in the RAM or the like, select a record closest to the current measurement result from among the measurement results in the past, and supplement the current measurement result by using the record. By supplementing the current measurement result by using the measurement results in the past, a frequency for measuring the input rate can be reduced. Therefore, it is possible to reduce a load to measure the input rate. For example, the input rate measurement unit 220 selects a record as follows.

FIG. 11 illustrates an example of a buffer data amount measurement table.

A buffer data amount measurement table 221 is generated by the input rate measurement unit 220 and is held in the RAM of the message server 200. The buffer data amount measurement table 221 is a table used to measure an input rate at this time. The input rate measurement unit 220 holds a buffer data amount measurement table used to measure the input rate in the past on the RAM.

The buffer data amount measurement table 221 includes items of an elapsed time from a previous checkpoint and a data amount of the input buffer unit. In the item of the elapsed time from the previous checkpoint, the elapsed time from the previous checkpoint is registered. In the item of the data amount of the input buffer unit, the amount of the data measured in the elapsed time is registered. The data amount may be referred to as a data size. It is assumed that the time be represented by the elapsed time from the previous checkpoint. For example, a time tx indicates a time when a time period tx has elapsed from a previous checkpoint completion time.

It is assumed that the input rate measurement unit 220 measure a data amount from the time t0 to the time tn in order to measure the input rate at this time. Each of the record of the data amount at each time in the past is compared with the records from the time t0 to the time tn so as to obtain a distance, and the record with the shortest distance is selected. In order to obtain the distance, first, the input rate measurement unit 220 obtains a time sequence TS including a time sequence t0, t1, . . . , and tn of the records and a time sequence t0', t1', . . . , and tn' of the records in the past. The time sequence TS is a sequence in which all the times belonging to both of the time sequences are arranged in chronological order. Next, the input rate measurement unit 220 obtains a data amount lk for each time tk of the time sequence TS regarding the record. When the time tk is a time in the record, the recorded data amount is used, and when the time tk is not the time in the record, values (ta,la) and (tb,lb)(ta<tk<tb) at the times that are before and after the time tk and closest to the time tk are used, in order to obtain the data amount lk at the time tk, for example, by using the formula (3).

$$lk = la + \frac{(lb - la) \times (tk - ta)}{tb - ta} \qquad (3)$$

Similarly, the input rate measurement unit 220 obtains a data amount at each time in the time sequence TS regarding the records in the past. Then, the input rate measurement unit 220 obtains a distance d from the formula (4).

$$d = \sum_i (l_i - l'_i)^2 \qquad (4)$$

The data amount $I_i$ is a data amount obtained with respect to a time $t_i$ for this record. The data amount $I_i'$ is a data amount obtained with respect to the time t for the records in the past.

The input rate measurement unit 220 recalculates and updates the input rate R each time when the data amount of the input buffer unit 210 is measured. Upon updating the input rate R, the input rate measurement unit 220 notifies the checkpoint scheduling unit 130 of the updated input rate R.

Next, measurement of the throughput by the throughput measurement unit 140 will be described.

FIG. 12 illustrates an example of a throughput measurement table.

The throughput measurement unit 140 measures a data processing amount of the stream processing unit 120 per unit time. The throughput measurement unit 140 uses, for example, special data referred to as a latency marker to measure the throughput.

The throughput measurement unit 140 records a time when data a is input to the stream processing unit 120 as a data processing start time ts. When data b is input to the stream processing unit 120 next, the throughput measurement unit 140 inputs a latency marker to the stream processing unit 120 subsequent to the data b. Upon receiving the latency marker, each task of the stream processing unit 120 immediately transfers the latency marker to a task at the subsequent stage. The throughput measurement unit 140 records a time when the latency marker passes through the task at the tail end of the stream processing unit 120 as a data processing end time te. The throughput measurement unit 140 obtains a processing time pt=te-ts from the data a to the data b. The throughput measurement unit 140 obtains a total data amount pv from the data a to the data b. The throughput measurement unit 140 may acquire the data amount from the data a to the data b from the stream processing unit 120, and the stream processing unit 120 may notify the throughput measurement unit 140 of the data amount at the time of data processing.

The throughput measurement unit 140 periodically measures the processing time pt and the total data amount pv at preset time intervals or each time when the number of pieces of data input to the stream processing unit 120 exceeds a preset threshold from that at the time of the previous measurement. The throughput measurement unit 140 records the measurement result to a throughput measurement table 141.

The throughput measurement table 141 is stored in the storage unit 110, for example. The throughput measurement table 141 includes items including the data processing start time, the data processing end time, the data processing time, and the total data amount. In the item of the data processing start time, a start time ts of the data processing by the stream processing unit 120 is registered. In the item of the data processing end time, an end time te of the data processing by the stream processing unit 120 is registered. In the item of the data processing time, a data processing time pt by the stream processing unit 120 is registered. In the item of the total data amount, a total sum pv of the processed data amount is registered.

The throughput measurement unit 140 obtains a throughput TH_p of the stream processing unit 120, for example, by using the formula (5) on the basis of the throughput measurement table 141.

$$TH\_p = \frac{\sum_i (pv_i - pv_{ave})(pt_i - pt_{ave})}{\sum_i (pt_i - pt_{ave})^2} \qquad (5)$$

Here, the number $pv_{ave}$ is an average value of a total data amount $pv_i$. The number $pt_{ave}$ is an average value of a data processing time $pt_i$.

The throughput measurement unit 140 recalculates and updates the throughput TH_p each time when measuring a new record in the throughput measurement table 141. When the throughput measurement unit 140 updates the throughput TH_p, the throughput measurement unit 140 notifies the checkpoint scheduling unit 130 of the updated throughput TH_p.

Next, measurement of the state update size by the state update size measurement unit 150 will be described.

FIG. 13 illustrates an example of a state update size measurement table.

The state update size measurement unit 150 measures a total sum uv of the data size of the state updated by each task included in the stream processing unit 120. The total sum of the data size of the state updated by each task is referred to as a state update size. For example, the state update size measurement unit 150 obtains the state update size uv by monitors a writing operation to the state by each task and accumulating the update sizes.

The state update size measurement unit 150 may periodically measure the state update size at preset time intervals or each time when the number of pieces of data input to the stream processing unit 120 exceeds a preset threshold from that at the time of the previous measurement of the state update size. The state update size measurement unit 150 records the measured state update size uv in a state update size measurement table 151.

The state update size measurement table 151 is stored in the storage unit 110, for example. The state update size measurement table 151 includes items of an elapsed time from the previous checkpoint and the state update size. In the item of the elapsed time from the previous checkpoint, the elapsed time from the previous checkpoint is registered.

In the item of the state update size, the state update size uv measured at the time represented by the elapsed time is registered.

The state update size measurement unit 150 obtains a state update size Increase rate D with respect to a time, for example, by using the formula (6) on the basis of the state update size measurement table 151.

$$D = \frac{\sum_i (t_i - t_{ave})(uv_i - uv_{ave})}{\sum_i (t_i - t_{ave})^2} \quad (6)$$

Here, the number $t_{ave}$ is an average value of $t_i$. The number $uv_{ave}$ is an average value of a state update size $uv_i$.

The state update size measurement unit 150 recalculates and updates the state update size increase rate D each time when a new record in the state update size measurement table 151 is measured. Upon updating the state update size increase rate D, the state update size measurement unit 150 notifies the checkpoint scheduling unit 130 of the updated state update size increase rate D.

Note that the state update size measurement unit 150 may save the state update size measurement table used to measure the state update size increase rate D in the past and complement the measurement results up to the current time with the measurement results in the past by a method similar to the method described regarding the measurement of the input rate.

Next, measurement of the restoration throughput by the restoration throughput measurement unit 160 will be described.

FIG. 14 illustrates an example of a restoration throughput measurement table.

When the stream processing unit 120 executes the recovery processing, the restoration throughput measurement unit 160 measures a backup size by used for the recovery processing and a time rt needed to restore the state by the backup. The restoration throughput measurement unit 160 may acquire the backup size by and the time rt from the stream processing unit 120 and may notify the restoration throughput measurement unit 160 of the backup size by and the time rt when the stream processing unit 120 executes the recovery processing. The restoration throughput measurement unit 160 records the backup size bv and the time rt in a restoration throughput measurement table 161.

The restoration throughput measurement table 161 is stored in the storage unit 110, for example. The restoration throughput measurement table 161 includes items of a backup size and a restoration time. In the item of the backup size, the backup size bv is registered. In the item of the restoration time, the restoration time rt is registered.

The restoration throughput measurement unit 160 obtains a restoration data amount per unit time as a restoration throughput TH_r, for example, by using the formula (7) on the basis of the restoration throughput measurement table 161.

$$TH\_r = \frac{\sum_i (rt_i - rt_{ave})(bv_i - bv_{ave})}{\sum_i (rt_i - rt_{ave})^2} \quad (7)$$

Here, the number $rt_{ave}$ is an average value of a time $rt_i$. The number $bv_{ave}$ is an average value of a backup size $bv_i$.

The restoration throughput measurement unit 160 recalculates and updates the restoration throughput TH_r each time when a new record in the restoration throughput measurement table 161 is measured. Upon updating the restoration throughput TH_r, the restoration throughput measurement unit 160 notifies the checkpoint scheduling unit 130 of the updated restoration throughput TH_r.

Next, measurement of the checkpoint throughput by the checkpoint control unit 170 will be described.

FIG. 15 illustrates an example of a checkpoint throughput measurement table.

The checkpoint control unit 170 records a checkpoint start time tcs. The checkpoint control unit 170 records a checkpoint end time tce when the checkpoint ends and obtains a checkpoint processing time ct=tce−tcs. Furthermore, the checkpoint control unit 170 acquires a backup size cv at the checkpoint from the stream processing unit 120. The checkpoint control unit 170 records the checkpoint start time tcs, the checkpoint end time tce, the checkpoint processing time ct, and the backup size cv in a checkpoint throughput measurement table 171.

The checkpoint throughput measurement table 171 is stored in the storage unit 110, for example. The checkpoint throughput measurement table 171 includes items of the checkpoint start time, the checkpoint end time, the checkpoint processing time, and the backup size. In the item of the checkpoint start time, the checkpoint start time tcs is registered. In the item of the checkpoint end time, the checkpoint end time tce is registered. In the item of the checkpoint processing time, the checkpoint processing time ct is registered. In the item of the backup size, the backup size cv is registered.

The checkpoint control unit 170 obtains a checkpoint processing size per unit time as a checkpoint throughput TH_cp, for example, by using the formula (8) on the basis of the checkpoint throughput measurement table 171. The checkpoint processing size per unit time can be said to be a backup processing size per unit time.

$$TH\_cp = \frac{\sum_i (ct_i - ct_{ave})(cv_i - cv_{ave})}{\sum_i (ct_i - ct_{ave})^2} \quad (8)$$

Here, the number $ct_{ave}$ is an average value of a checkpoint processing time $ct_i$. The number $cv_{ave}$ is an average value of a backup size $cv_i$.

The checkpoint control unit 170 recalculates and updates the checkpoint throughput TH_cp each time when a new record in the checkpoint throughput measurement table 171 is measured. Upon updating the checkpoint throughput TH_cp, the checkpoint control unit 170 notifies the checkpoint scheduling unit 130 of the updated checkpoint throughput TH_cp and the backup size cv of the completed checkpoint.

Next, a processing procedure of the node 100 will be described.

Figure 16:
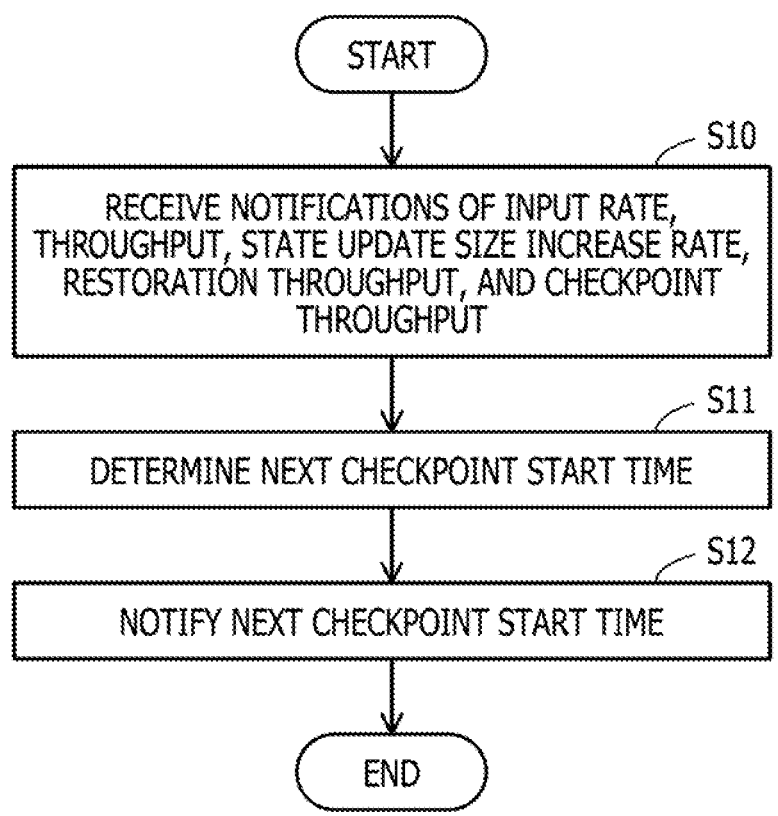
FIG. 16 is a flowchart illustrating an example of checkpoint start time determination.

FIG. 16 is a flowchart illustrating an example of checkpoint start time determination.

(S10) The checkpoint scheduling unit 130 receives notifications of the input rate, the throughput of the stream processing by the stream processing unit 120, the state update size increase rate, the restoration throughput, and the checkpoint throughput. The input rate measurement unit 220 notifies the checkpoint scheduling unit 130 of the input rate. The throughput measurement unit 140 notifies the checkpoint scheduling unit 130 of the throughput of the stream processing. The state update size measurement unit 150 notifies the checkpoint scheduling unit 130 of the state update size increase rate. The restoration throughput measurement unit 160 notifies the checkpoint scheduling unit 130 of the restoration throughput. The checkpoint control unit 170 notifies the checkpoint scheduling unit 130 of the checkpoint throughput. Note that the checkpoint control unit 170 notifies the checkpoint scheduling unit 130 of the checkpoint throughput as well as the backup size. Timings at which the input rate, the throughput of the stream processing, the state update size increase rate, the restoration throughput, and the checkpoint throughput are notified to the checkpoint scheduling unit 130 may be the same or different. Note that the checkpoint scheduling unit 130 may proceed the procedure to step S11 without receiving a part of the notifications of the input rate, the throughput of the stream processing, the state update size increase rate, the restoration throughput, and the checkpoint throughput.

(S11) The checkpoint scheduling unit 130 determines a next checkpoint start time. For example, the checkpoint scheduling unit 130 waits for an appropriate backup timing before a buffer overflow occurs in consideration of times needed for the backup processing of the state and the recovery processing. The time needed for the backup processing of the state and the time needed for the recovery processing are predicted on the basis of the input rate, the throughput of the stream processing, the state update size, the restoration throughput, and the checkpoint throughput.

(S12) The checkpoint scheduling unit 130 notifies the checkpoint control unit 170 of the next checkpoint start time determined in step S11. Then, the checkpoint start time determination processing ends.

The checkpoint scheduling unit 130 repeatedly executes the above procedure at predetermined time intervals or the like. With this execution, a next checkpoint start time can be flexibly determined depending on changes in the input rate, the throughput of the stream processing, the state update size, or the like.

Upon receiving the checkpoint start time, the checkpoint control unit 170 starts a timer to detect the checkpoint start time. When detecting that the checkpoint start time comes, the checkpoint control unit 170 inputs a checkpoint to the stream processing unit 120. With this operation, the backup processing of the state is started, and backup of the state can be acquired.

The checkpoint scheduling unit 130 updates the checkpoint start time on the basis of the updated information when at least one of the input rate, the update amount of the state data per unit time, the throughput of the stream processing, the restoration throughput, and the checkpoint throughput before the determined checkpoint start time comes. There is a case where, before the determined checkpoint start time, the updated checkpoint start time is notified from the checkpoint scheduling unit 130 to the checkpoint control unit 170. In this case, the checkpoint control unit 170 issues a checkpoint at the updated checkpoint start time by updating the timer.

Next, an example of the checkpoint start time determination in step S11 will be described.

Figure 17:
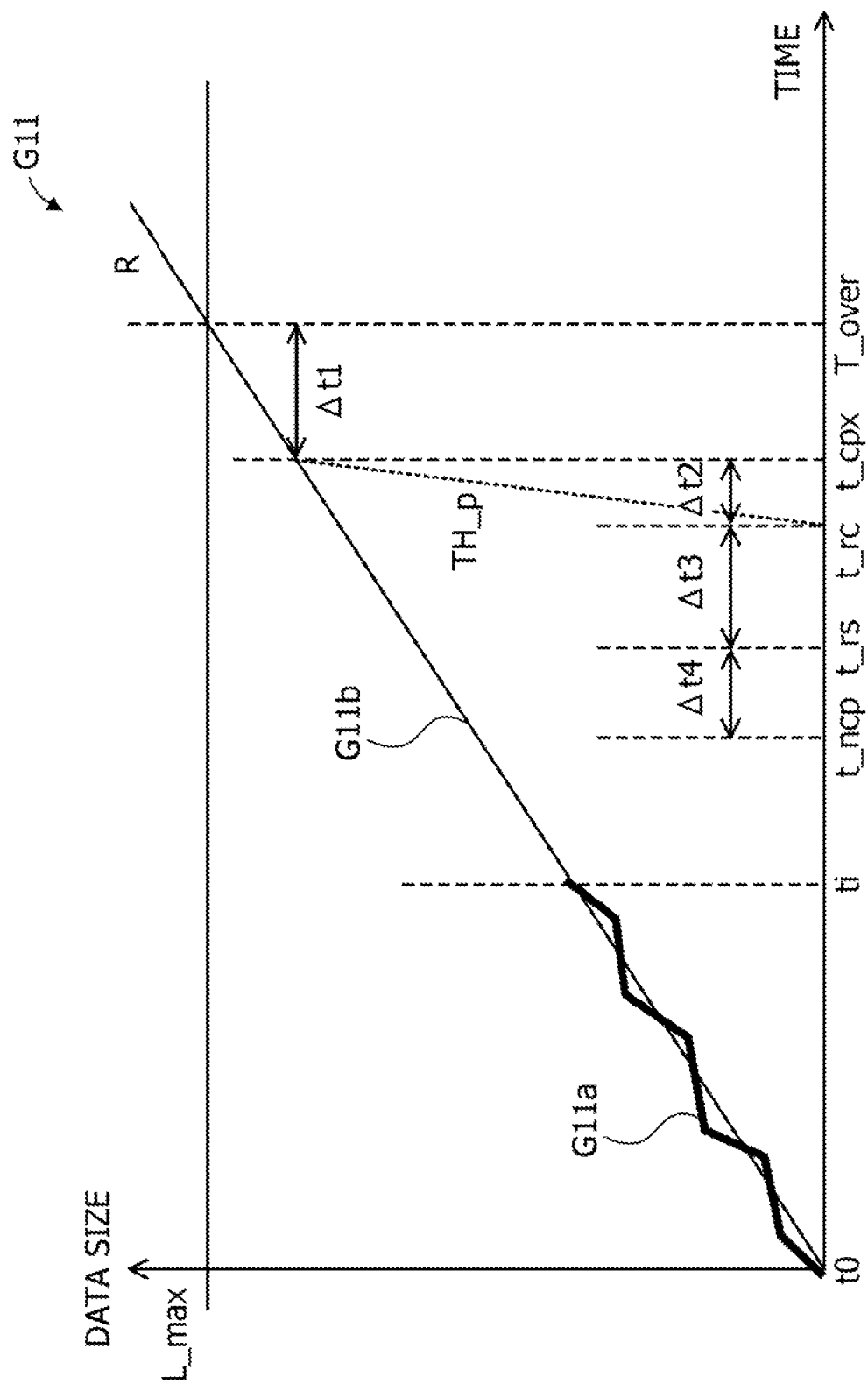
FIG. 17 is a diagram illustrating an example of the checkpoint start time determination.

FIG. 17 is a diagram illustrating an example of the checkpoint start time determination.

A graph G11 illustrates a relationship between a time and a buffer data amount. The horizontal axis of the graph G11 indicates the time, and the vertical axis indicates the data size held by the input buffer unit 210. The reference L_max on the vertical axis indicates an upper limit size of the input buffer unit 210. Regarding the time on the horizontal axis, a previous checkpoint end time t0 is set as an origin, and the time indicates an elapsed time from the time t0. Each time is expressed by the elapsed time from the time t0. For example, a time tx indicates a time when the elapsed time from the time t0 is tx.

The checkpoint scheduling unit 130 obtains a next checkpoint start time t_ncp by using the following formulas (9) to (13).

$$t\_ncp = \frac{t\_rs \times TH\_cp}{TH\_cp + D} \quad (9)$$

$$t\_rs = t\_rc - \frac{cv}{TH\_rs} - \alpha \quad (10)$$

$$t\_rc = \frac{t\_cpx \times TH\_p}{TH\_p + R} \quad (11)$$

$$t\_cpx = \frac{T\_over \times TH\_cp}{TH\_cp + D} \quad (12)$$

$$T\_over = \frac{L\_max}{R} \quad (13)$$

Here, the reference TH_cp indicates the latest checkpoint throughput notified from the checkpoint control unit 170. The reference D indicates the latest state update size increase rate notified from the state update size measurement unit 150. The reference TH_rs indicates the latest restoration throughput notified from the restoration throughput measurement unit 160. The reference a indicates a preset margin. For example, the margin a is a previously estimated value according to a time from detection of system stop to recovery start. The reference TH_p indicates the latest throughput of the stream processing notified from the throughput measurement unit 140. The reference R indicates the latest input rate notified from the input rate measurement unit 220.

For example, it is assumed that the input rate measurement unit 220 notify the checkpoint scheduling unit 130 of the input rate R at a time ti. A broken line G11a in the graph G11 indicates a change in the data size in the input buffer unit 210 from the time t0 to the time ti. An indication of a straight line G11b in the graph G11 is an input rate R calculated on the basis of the data of the broken line G11a.

A time T_over is a predicted time when the data size held in the input buffer unit 210 reaches the upper limit size L_max. When the checkpoint processing is completed before the time T_over, a free space in the input buffer unit 210 is generated. Therefore, it is possible to avoid a buffer overflow. A time period t1 indicates a time needed for the checkpoint processing in a case where the checkpoint processing is completed at the time T_over. Furthermore, a time t_cpx indicates a checkpoint start time in that case. Δt1= (D×t_cpx/TH_cp) is satisfied. The reference D×t_cpx indicates a data size of a backup target state at the time t_cpx.

If the recovery processing due to a system failure or the like is not executed, the time t_cpx may be set as a next checkpoint start time. However, in actual, it is needed to consider that the recovery processing occurs. Since the recovery processing is the restoration processing of the state and the recalculation processing of the stream, a start time at the tail end of the recovery processing that can avoid the overflow is a time t_rs. A time period Δt2 is a time needed for the recalculation processing of the stream. A time period Δt3 is a time needed for the restoration processing.

When the recovery processing starts at or before the time t_rs, the state restoration processing, the stream recalculation processing, and the checkpoint processing can be completed before the overflow predicted time T_over.

The time period Δt3 needed for the restoration processing of the state that starts at the time t_rs is calculated from the backup size cv of the previous checkpoint and the restoration throughput TH_rs. The time period Δt2 needed for the stream recalculation processing is calculated from an estimated amount (=R×t_rc) of the data size in the input buffer unit 210 at the restoration processing completion time t_rc and the throughput Tp. For example, Δt2=(R×t_rc/TH_p) is satisfied. The reference R×t_rc indicates a data size of the data stored in the input buffer unit 210 at the time t_rc. Δt3=cv/TH_rs is satisfied.

In order to guarantee that the recovery processing does not occur at and after the time t_rs, it is needed to complete the checkpoint before the time t_rs. Therefore, the checkpoint scheduling unit 130 estimates a checkpoint processing time Δt4 by using the checkpoint throughput TH_cp and the state update size increase rate D and obtains a next checkpoint start time t_ncp. Δt4=(D×t_ncp/TH_cp) is satisfied. The reference D×t_ncp indicates a data size of a backup target state at the time t_ncp.

By inputting the next checkpoint to the stream processing unit 120 at the time t_ncp, even when the recovery processing occurs thereafter, the checkpoint control unit 170 can avoid the overflow of the input buffer unit 210.

Note that, in a case where the time t_ncp notified from the checkpoint scheduling unit 130 to the checkpoint control unit 170 is before the current time ti, the checkpoint control unit 170 may immediately issue a checkpoint and notify a user or the like of an alert.

Furthermore, the next checkpoint start time may be a time t_ncp' indicated by the formula (14).

$$t\_ncp' = t\_ncp - \beta\left(\frac{L\_max}{R} - t\_ncp\right) \quad (14)$$

Here, β is a real number satisfying 0<β<1, and is set in advance. In this case, the larger β is, the earlier the next checkpoint start time is, and a possibility of the buffer overflow in the input buffer unit 210 caused by the recovery processing can be further reduced.

Note that the checkpoint scheduling unit 130 may acquire the input rate, the throughput of the stream processing unit 120, the state update size increase rate, the restoration throughput, and the checkpoint throughput at preset time intervals. Next, a procedure of the checkpoint start time determination in this case will be described.

Figure 18:
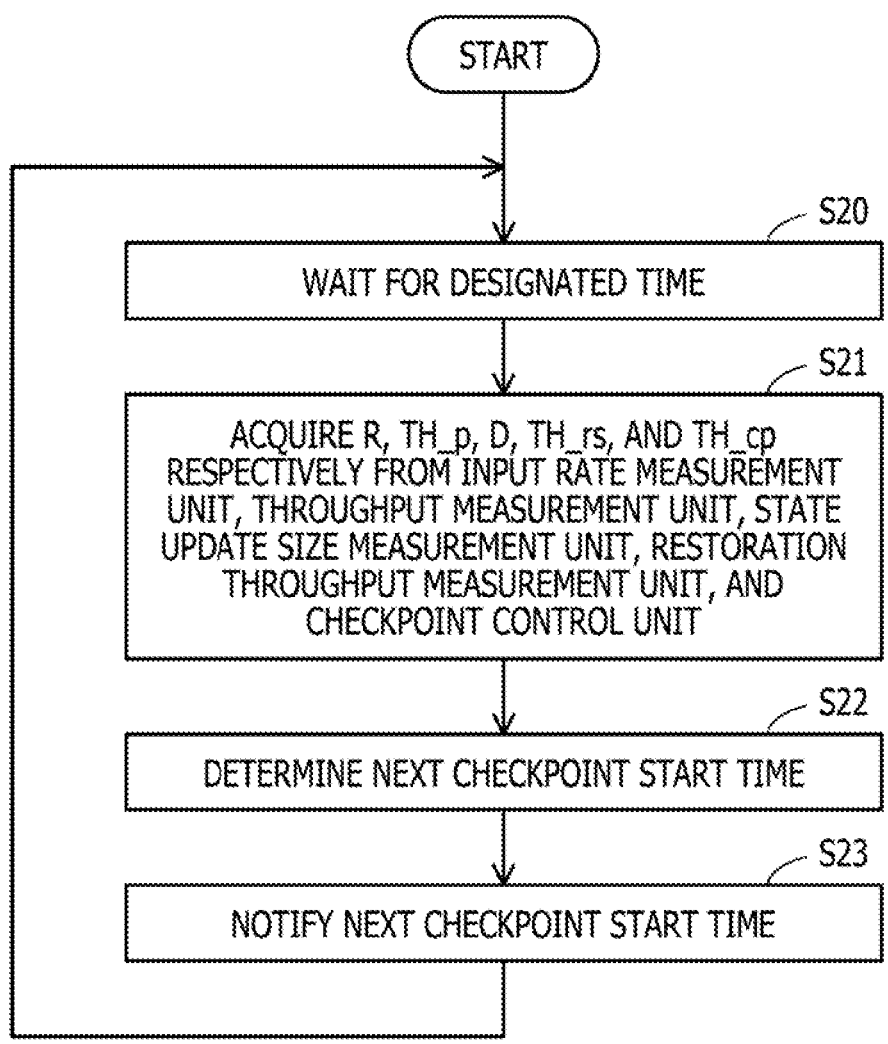
FIG. 18 is a flowchart illustrating another example of the checkpoint start time determination.

FIG. 18 is a flowchart illustrating another example of the checkpoint start time determination.

(S20) The checkpoint scheduling unit 130 waits for a designated time. The designated time is preset.

(S21) The checkpoint scheduling unit 130 acquires the input rate R, the throughput TH_p, the state update size increase rate D, the restoration throughput TH_rs, and the checkpoint throughput TH_cp respectively from the input rate measurement unit 220, the throughput measurement unit 140, the state update size measurement unit 150, the restoration throughput measurement unit 160, and the checkpoint control unit 170.

(S22) The checkpoint scheduling unit 130 determines a next checkpoint start time on the basis of the input rate R, the throughput TH_p, the state update size increase rate D, the restoration throughput TH_rs, and the checkpoint throughput TH_cp.

(S23) The checkpoint scheduling unit 130 notifies the checkpoint control unit 170 of the next checkpoint start time determined in step S22. Then, the procedure proceeds to step S20.

Note that the determination of the next checkpoint start time in step S22 and the notification of the next checkpoint start time in step S23 are respectively similar to the processing in step S11 and the processing in step S12.

According to the procedure in FIG. 18, as in the procedure in FIG. 16, the node 100 can appropriately determine the checkpoint start time.

Next, another example of the information processing system according to the second embodiment will be described. Although the single message server 200 is indicated in the description with reference to FIGS. 2 and 4, the number of message servers 200 may be plural.

For example, the checkpoint scheduling unit 130 may calculate a candidate time of the checkpoint start time for each of a plurality of input buffer units that stores the data used for the stream processing. Then, the checkpoint scheduling unit 130 may determine the earliest candidate time from among the plurality of calculated candidate times as the checkpoint start time.

Figure 19:
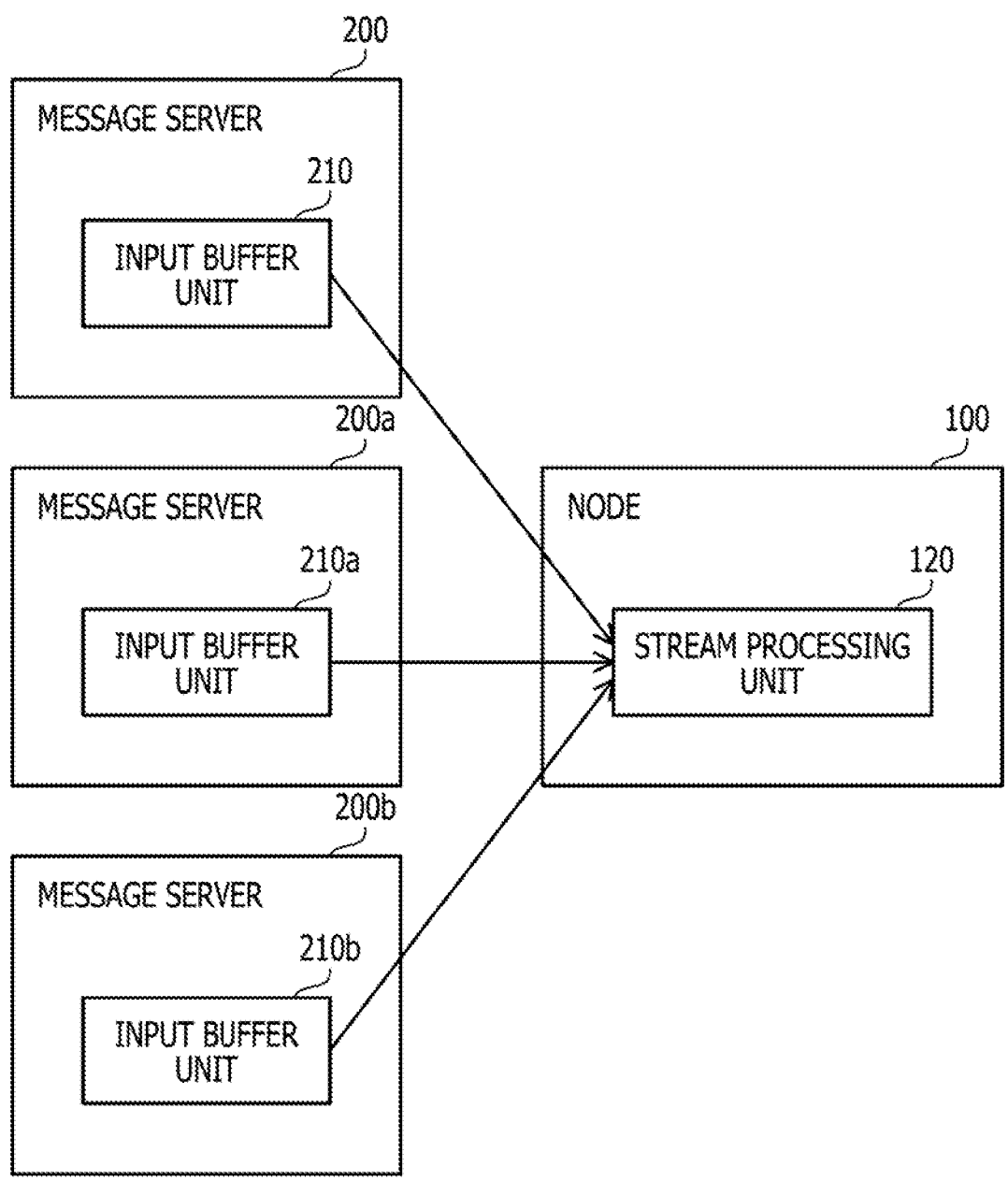
FIG. 19 illustrates another example of the information processing system.

FIG. 19 illustrates another example of the information processing system.

The information processing system illustrated in FIG. 19 includes message servers 200a and 200b in addition to the message server 200. The message server 200a Includes an input buffer unit 210a. The message server 200b includes an input buffer unit 210b. Similarly to the message server 200, each of the message servers 200a and 200b includes an input rate measurement unit and an input buffer management unit. However, these units are not illustrated in FIG. 19.

The input buffer units 210, 210a, and 210b stores data transmitted from edge devices 300, 300a, and 300b. The stream processing unit 120 acquires the data stored in the input buffer units 210, 210a, and 210b and executes the stream processing. In this way, the plurality of input buffer units may be provided for the stream processing unit 120.

In this case, the checkpoint scheduling unit 130 acquires input rates to the input buffer units 210, 210a, and 210b respectively from the message servers 200, 200a, and 200b. Then, the checkpoint scheduling unit 130 obtains a next backup processing start time (for example, checkpoint start time) by the method described above by using the input rates of the respective input buffer units 210, 210a, and 210b and employs the earliest time. With this operation, even when the plurality of input buffer units is provided, it is possible to reduce a load caused by the backup processing while avoiding the occurrence of the buffer overflow in each input buffer unit.

By the way, cost of the backup processing by the checkpoint Indicated in the second embodiment is high. In the backup processing by the checkpoint, the state data on the RAM is copied, compressed, and written in the snapshot storage unit 190 as a file or a record of a DB. Therefore, resources of the CPU 101 and the Input/Output (IO) are consumed. Furthermore, a backup saving destination may be an external storage device that is connected to the network 20 and is physically different from the node 100 from viewpoint of failure countermeasure, or a network traffic may occur in accordance with the backup processing. Therefore, when the checkpoints are issued at short time Intervals, there is a possibility that the original performance (throughput and latency) of the stream processing of the node 100 is deteriorated due to the load of the backup processing.

On the other hand, when the time intervals of the checkpoints are lengthened, the amount of the data to be held in the input buffer unit 210 increases, and a possibility such that the input buffer unit 210 overflows at the time of the recovery increases. In order to prepare for the recovery, it is needed to hold the data at and after the checkpoint by the input buffer unit 210 until the next checkpoint is completed (until next checkpoint flows to final stage of pipeline). This is because, since the state to be restored for each task of the pipeline is a state at the time of the previous checkpoint in the recovery, it is needed to execute (recalculate) the stream processing from the data after the checkpoint again. Since the data is continuously input to the input buffer unit 210 during the recalculation, it is needed that the recalculation catch up with the data input before the input buffer unit 210 overflows. As the time intervals of the checkpoints become longer, the amount of the data to be held by the input buffer unit 210, for example, the amount of the data to be recalculated increases, and the recalculation does not catch up with the data input. Therefore, the possibility of the overflow of the input buffer unit 210 increases.

There is a case where a user manually sets a timing of the checkpoint, for example, as a regular time interval. However, in a case where the time interval of the checkpoints is too short, more CPUs and network resources are needed in order to avoid the deterioration in the performance of the stream processing. On the contrary, in a case where the time interval of the checkpoints is too long, more storage resources are needed in the input buffer unit 210 in order to avoid the overflow of the input buffer unit 210. Both cases cause an increase in cost of system hardware. Moreover, in recent years, with widespread of Internet of Things (IoT) devices and mobile services, a frequency of the data input to the input buffer unit 210 changes depending on a situation in the real world. For example, a frequency of collection of event messages of vehicle data (position, speed, or the like) changes depending on the day of the week and a time. Therefore, it is difficult to obtain an optimal timing of the checkpoint in advance.

Therefore, the node 100 dynamically and automatically adjusts the next checkpoint time on the basis of the input rate, the throughput of the stream processing, the restoration throughput, and the checkpoint throughput. With this operation, the checkpoint processing cost can be reduced while avoiding the buffer overflow. By reducing the checkpoint processing cost, the deterioration in the performance of the stream processing by the node 100 can be suppressed. Furthermore, these advantages can be realized without increasing the system cost, for example, without strengthening hardware.

Note that the input buffer unit 210 is provided in the message server 200. However, the Input buffer unit 210, the input rate measurement unit 220, and the input buffer management unit 230 may be provided in the node 100. For example, a plurality of nodes 100 is provided, and each node holds the same data stream. Any one of the nodes is used as an active system, and other nodes are used as standby systems. The active node acquires the backup of the state in an external storage. Then, even when the active node goes down due to a failure, the standby node can restore the state backed up in the external storage and continue to operate the system by using the data stream held in a buffer of the standby node.

Furthermore, the information processing in the first embodiment can be realized by executing the program by the processing device 14. The information processing in the second embodiment can be realized by executing the program by the CPU 101. The program can be recorded in the computer-readable recording medium 23.

For example, by distributing the recording medium 23 that records the program, the program can be distributed. Furthermore, the program may be stored in another computer and distributed through a network. For example, the computer may store (install) a program recorded in the recording medium 23 or a program received from another computer in a storage device such as the RAM 102 or the HDD 103, and read the program from the storage device, and execute the read program.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a first storage device configured to store state data corresponding to processing executed on input data that is stored in a buffer; and
   a processing device configured to:
   calculate a first time point, the first time point being a point of time when the buffer overflows from an input rate of the input data to the buffer; and
   determine a second time point, by using the input rate, an update amount of state data per unit time, a first throughput of a backup processing on the state data from the first storage device to a second storage device, a second throughput of restoration processing on the state data from the second storage device to the first storage device, and a third throughput of processing, the second time point being a point of time that is before the first time point and being when backup processing on the state data is to be started.

2. The information processing system according to claim 1, wherein
   when at least any one of the input rate, the update amount of the state data per unit time, the first throughput, the second throughput, and the third throughput is updated before the second time point comes, the processing device updates the second time point.

3. The information processing system according to claim 1, wherein
   the processing device is configured to:
   calculates a first start time point of the backup processing on the basis of the update amount of the state data per unit time and the first throughput, the first start time point being a point of time to start the backup processing such that the backup processing is completed at the first time point;
   calculates a second start time point of the restoration processing on the basis of the input rate, the second throughput, and the third throughput, the second start time point being a point of time to start the restoration processing such that recovery of the state data of the first storage device by using backup of the state data is completed at the first start time;

calculates a third start time point of the backup processing on the basis of the update amount of the state data per unit time and the first throughput, the third start time point being a point of time to start the backup processing such that the backup processing is completed at the second start time; and sets the second time point by using the third start time point or a time that is predetermined time before the third start time point.

4. The information processing system according to claim 1, wherein the processing device is configured to, when starting the backup processing at the second time point and ending the backup processing, delete, from the buffer, the input data that has been input to the processing before the second time point among the input data stored in the buffer.

5. The information processing system according to claim 1, wherein the processing device is configured to:

calculate a candidate time point of the second time point for each of a plurality of buffers, each buffer being configured to store the input data used for the processing; and set the second time point by using an earliest candidate time point of a plurality of calculated candidate time points.

6. The information processing system according to claim 1, wherein the processing is stream processing including a plurality of tasks that processes the input data.

7. An information processing method implemented by a computer, the method comprising:

calculating a first time point, the first time point being a point of time when a buffer overflows from an input rate of input data to the buffer configured to store the input data; and determining a second time point, by using the input rate, an update amount of state data per unit time, a first throughput of backup processing on the state data from a first storage device that stores the state data to a second storage device, a second throughput of restoration processing on the state data from the second storage device to the first storage device, and a third throughput of processing, the second time point being a point of time that is before the first time point and being when backup processing on the state data is to be started, the state data being data corresponding to processing executed on the input data.

8. A non-transitory computer-readable storage medium for storing an information processing program which causes a processor to perform processing, the processing comprising:

calculating a first time point, the first time point being a point of time when a buffer overflows from an input rate of input data to the buffer configured to store the input data; and determining a second time point, by using the input rate, an update amount of state data per unit time, a first throughput of a backup processing on the state data from a first storage device that stores the state data to a second storage device, a second throughput of restoration processing on the state data from the second storage device to the first storage device, and a third throughput of processing, the second time point being a point of time that is before the first time point and being when backup processing on the state data is to be started, the state data being data corresponding to processing executed on the input data.

* * * * *